US009988512B2

(12) United States Patent
Crocco et al.

(10) Patent No.: US 9,988,512 B2
(45) Date of Patent: Jun. 5, 2018

(54) HIGHLY FILLED POLYURETHANE COMPOSITES

(71) Applicants: BORAL IP HOLDINGS (AUSTRALIA) PTY LIMITED, North Sydney (AU); Zhang Ying, San Antonio, TX (US); Guy Crocco, New Braunfels, TX (US); Li Ai, San Antonio, TX (US)

(72) Inventors: Guy Crocco, New Braunfels, TX (US); Ying Zhang, San Antonio, TX (US); Li Ai, San Antonio, TX (US)

(73) Assignee: Boral IP Holdings (Australia) PTY Limited, North Sydney (AU)

( * ) Notice: Subject to any disclaimer, the term of this patent is extended or adjusted under 35 U.S.C. 154(b) by 98 days.

(21) Appl. No.: 14/784,196

(22) PCT Filed: Jan. 22, 2015

(86) PCT No.: PCT/US2015/012453
§ 371 (c)(1),
(2) Date: Oct. 13, 2015

(87) PCT Pub. No.: WO2016/118141
PCT Pub. Date: Jul. 28, 2016

(65) Prior Publication Data
US 2016/0369080 A1 Dec. 22, 2016

(51) Int. Cl.
| | | |
|---|---|---|
| C08K 3/00 | (2018.01) | |
| C08G 18/76 | (2006.01) | |
| C08G 18/40 | (2006.01) | |
| C08G 18/48 | (2006.01) | |
| C08G 18/42 | (2006.01) | |
| C08G 18/50 | (2006.01) | |
| C08G 18/18 | (2006.01) | |
| C08K 11/00 | (2006.01) | |
| C08G 101/00 | (2006.01) | |

(52) U.S. Cl.
CPC ........ *C08K 3/0033* (2013.01); *C08G 18/1816* (2013.01); *C08G 18/4018* (2013.01); *C08G 18/4208* (2013.01); *C08G 18/482* (2013.01); *C08G 18/4804* (2013.01); *C08G 18/4808* (2013.01); *C08G 18/4816* (2013.01); *C08G 18/5021* (2013.01); *C08G 18/7664* (2013.01); *C08K 3/013* (2018.01); *C08K 11/005* (2013.01); *C08G 2101/00* (2013.01); *C08G 2101/0008* (2013.01); *C08G 2101/0016* (2013.01); *C08G 2101/0025* (2013.01); *C08G 2101/0033* (2013.01); *C08G 2101/0083* (2013.01)

(58) Field of Classification Search
None
See application file for complete search history.

(56) References Cited

U.S. PATENT DOCUMENTS

| | | | |
|---|---|---|---|
| 529,535 A | 11/1894 | Smith | |
| 529,538 A | 11/1894 | Vaughan | |
| 2,526,033 A | 10/1950 | Lyon | |
| 790,527 A | 1/1956 | Barthel, Jr. | |
| 2,817,875 A | 12/1957 | Harris et al. | |
| 2,902,388 A | 9/1959 | Szukiewicz | |
| 2,983,693 A | 5/1961 | Sievers | |
| 3,065,500 A | 11/1962 | Berner | |
| 3,071,297 A | 1/1963 | Lee | |
| 3,078,512 A | 2/1963 | De Haven | |
| 3,223,027 A | 12/1965 | Soda et al. | |
| 3,262,151 A | 7/1966 | Oxel | |
| 3,269,961 A | 8/1966 | Bruson et al. | |
| 3,308,218 A | 3/1967 | Wiegand et al. | |
| 3,466,705 A | 9/1969 | Richie | |
| 3,499,848 A | 3/1970 | Weisman | |
| 3,528,126 A | 9/1970 | Ernst et al. | |
| 3,566,448 A | 3/1971 | Ernst | |

(Continued)

FOREIGN PATENT DOCUMENTS

| | | |
|---|---|---|
| CA | 2037130 | 1/2006 |
| CN | 1251596 | 4/2000 |

(Continued)

OTHER PUBLICATIONS

Multranol 4035 Functionality, downloaded Apr. 18, 2017.*
Multranol 4035 Technical Data Sheet, download Apr. 18, 2017.*
Multranol 3900 Technical Data Shee, downloaded Apr. 18, 2017.*
DOE NETL Report on Advanced Flue Gas Conditioning as a Retrofit Upgrade to Enhance PM Collection from Coal-Fired Electric Utility Boilers, Dec. 2003. (Year: 2003).*
International Search Report and Written Opinion of the International Searching Authority in PCT/US2015/012453 dated Sep. 10, 2015.
Guhanathan, S. et al., "Studies on Castor Oil-based Polyurethane/Polyacrylonitrile Interpenetrating Polymer Network for Toughening of Unsaturated Polyester Resin," Journal of Applied Polymer Science, 92:817-829 (2004).

(Continued)

*Primary Examiner* — Christopher M Rodd

(57) ABSTRACT

Composite materials and methods for their preparation are described herein. The composite materials can comprise (a) a polyurethane and (b) from 35% to 90% by weight, based on the total weight of the composite, of a particulate filler dispersed in the polyurethane. The polyurethane can be formed by the reaction of (i) one or more isocyanates selected from the group consisting of diisocyanates, polyisocyanates, and mixtures thereof, and (ii) one or more polyols. The one or more polyols that form the polyurethane comprise a high hydroxyl number polyol having a hydroxyl number of at least 250 mg KOH/g. In some cases, the one or more polyols that form the polyurethane can have a weight average equivalent weight of from 200 to 1100 amu. In some cases, the one or more polyols that form the polyurethane can include less than 5% by weight, based on the total weight of the one or more polyols that form the polyurethane, of one or more flexible polyols having a hydroxyl number of less than 150 mg KOH/g and a functionality of less than 3.

15 Claims, 3 Drawing Sheets

(56) References Cited

U.S. PATENT DOCUMENTS

| | | |
|---|---|---|
| 3,619,268 A | 11/1971 | Robertson et al. |
| 3,642,964 A | 2/1972 | Rausch et al. |
| 3,644,168 A | 2/1972 | Bonk et al. |
| 3,698,731 A | 10/1972 | Wolf-Dieter et al. |
| 3,726,624 A | 4/1973 | Schwarz |
| 3,736,081 A | 5/1973 | Yovanvich |
| 3,738,895 A | 6/1973 | Paymal |
| 3,764,247 A | 10/1973 | Garrett et al. |
| 3,768,937 A | 10/1973 | Haga et al. |
| 3,774,428 A | 11/1973 | Derry et al. |
| 3,802,582 A | 4/1974 | Brock |
| 3,816,043 A | 6/1974 | Snelling et al. |
| 3,819,574 A | 6/1974 | Brown et al. |
| 3,824,057 A | 7/1974 | Kornylak et al. |
| 3,830,776 A | 8/1974 | Carlson et al. |
| 3,832,429 A | 8/1974 | Charpentier et al. |
| 3,841,390 A | 10/1974 | DiBenedetto et al. |
| 3,843,757 A | 10/1974 | Ehrenfreund et al. |
| 3,852,387 A | 12/1974 | Bortnick et al. |
| 3,867,494 A | 2/1975 | Rood et al. |
| 3,878,027 A | 4/1975 | Troutner |
| 3,890,077 A | 6/1975 | Holman |
| 3,910,179 A | 10/1975 | Troutner |
| 3,917,547 A | 11/1975 | Massey |
| 3,917,774 A | 11/1975 | Sagane et al. |
| 3,928,258 A | 12/1975 | Alexander |
| 3,963,679 A | 6/1976 | Ullrich et al. |
| 3,981,654 A | 9/1976 | Rood et al. |
| 3,991,005 A | 11/1976 | Wallace |
| 3,999,230 A | 12/1976 | Bruning et al. |
| 3,999,320 A | 12/1976 | Zaubzer |
| 4,005,035 A | 1/1977 | Deaver |
| 4,042,314 A | 8/1977 | Bruning et al. |
| 4,051,742 A | 10/1977 | Johansson et al. |
| 4,060,579 A | 11/1977 | Schmitzer et al. |
| 4,065,410 A | 12/1977 | Schäfer et al. |
| 4,073,840 A | 2/1978 | Saidla |
| 4,078,032 A | 3/1978 | Wenner |
| 4,092,276 A | 5/1978 | Narayan |
| 4,104,094 A | 8/1978 | Peterson |
| 4,107,248 A | 8/1978 | Schlieckmann |
| 4,120,626 A | 10/1978 | Keller |
| 4,127,040 A | 11/1978 | Moore et al. |
| 4,128,369 A | 12/1978 | Kemerer et al. |
| 4,137,200 A | 1/1979 | Wood et al. |
| 4,137,265 A | 1/1979 | Edwards et al. |
| 4,141,662 A | 2/1979 | Hepper et al. |
| 4,141,862 A | 2/1979 | Raden et al. |
| 4,143,759 A | 3/1979 | Paradis |
| 4,149,840 A | 4/1979 | Tippman |
| 4,153,766 A | 5/1979 | Koide et al. |
| 4,153,768 A | 5/1979 | Blount |
| 4,160,749 A | 7/1979 | Schneider et al. |
| 4,160,853 A | 7/1979 | Ammons |
| 4,163,824 A | 8/1979 | Saidla |
| 4,164,439 A | 8/1979 | Coonrod |
| 4,164,526 A | 8/1979 | Clay et al. |
| 4,165,414 A | 8/1979 | Narayan et al. |
| 4,180,538 A | 12/1979 | Morikawa et al. |
| 4,200,699 A | 4/1980 | Treadwell |
| 4,209,605 A | 6/1980 | Hoy et al. |
| 4,210,572 A | 7/1980 | Herman et al. |
| 4,214,864 A | 7/1980 | Tabler |
| 4,221,877 A | 9/1980 | Cuscurida et al. |
| 4,240,950 A | 12/1980 | Von Bonin et al. |
| 4,241,131 A | 12/1980 | Bailey |
| 4,243,755 A | 1/1981 | Marx et al. |
| 4,247,656 A | 1/1981 | Janssen |
| 4,248,957 A | 2/1981 | Sander et al. |
| 4,248,975 A | 2/1981 | Satterly |
| 4,251,428 A | 2/1981 | Recker et al. |
| 4,254,002 A | 3/1981 | Sperling et al. |
| 4,254,176 A | 3/1981 | Müller et al. |
| 4,256,846 A | 3/1981 | Ohashi et al. |
| 4,260,538 A | 4/1981 | Iseler et al. |
| 4,261,946 A | 4/1981 | Goyert et al. |
| 4,272,377 A | 6/1981 | Gerlach et al. |
| 4,275,033 A | 6/1981 | Schulte et al. |
| 4,276,337 A | 6/1981 | Coonrod |
| 4,282,988 A | 8/1981 | Hulber, Jr. |
| 4,284,826 A | 8/1981 | Aelony |
| 4,290,248 A | 9/1981 | Kemerer et al. |
| 4,300,776 A | 11/1981 | Taubenmann |
| 4,330,494 A | 5/1982 | Iwata et al. |
| 4,330,634 A | 5/1982 | Rodaway |
| 4,331,726 A | 5/1982 | Cleary |
| 4,338,422 A | 7/1982 | Jackson, Jr. et al. |
| 4,339,366 A | 7/1982 | Blount |
| 4,342,847 A | 8/1982 | Goyert et al. |
| 4,344,873 A | 8/1982 | Wick |
| 4,347,281 A | 8/1982 | Futcher et al. |
| 4,359,359 A | 11/1982 | Gerlach et al. |
| 4,359,548 A | 11/1982 | Blount |
| 4,366,204 A | 12/1982 | Briggs |
| 4,367,259 A | 1/1983 | Fulmer et al. |
| 4,376,171 A | 3/1983 | Blount |
| 4,378,171 A | 3/1983 | Schmidt |
| 4,381,352 A | 4/1983 | McBrayer |
| 4,382,056 A | 5/1983 | Coonrod |
| 4,383,818 A | 5/1983 | Swannell |
| 4,390,581 A | 6/1983 | Cogswell et al. |
| 4,395,214 A | 7/1983 | Phipps et al. |
| 4,396,791 A | 8/1983 | Mazzoni |
| 4,397,983 A | 8/1983 | Hill et al. |
| 4,412,033 A | 10/1983 | LaBelle et al. |
| 4,421,871 A | 12/1983 | Korczak et al. |
| 4,439,548 A | 3/1984 | Weisman |
| 4,450,133 A | 5/1984 | Cafarelli |
| 4,460,737 A | 7/1984 | Evans et al. |
| 4,465,500 A | 8/1984 | Motsinger et al. |
| 4,483,727 A | 11/1984 | Eickman et al. |
| 4,489,023 A | 12/1984 | Proksa |
| 4,512,942 A | 4/1985 | Babbin et al. |
| 4,514,162 A | 4/1985 | Schulz |
| 4,521,428 A | 6/1985 | Nisato et al. |
| 4,532,098 A | 7/1985 | Campbell et al. |
| 4,540,357 A | 9/1985 | Campbell et al. |
| 4,546,120 A | 10/1985 | Peerman et al. |
| 4,568,702 A | 2/1986 | Mascioli |
| 4,576,718 A | 3/1986 | Reischl et al. |
| 4,581,186 A | 4/1986 | Larson |
| 4,595,709 A | 6/1986 | Reischl |
| 4,597,927 A | 7/1986 | Zeitler et al. |
| 4,600,311 A | 7/1986 | Mourrier et al. |
| 4,604,410 A | 8/1986 | Altenberg |
| 4,649,162 A | 3/1987 | Roche et al. |
| 4,661,533 A | 4/1987 | Stobby |
| 4,667,157 A | 6/1987 | Ciammaichella et al. |
| 4,677,157 A | 6/1987 | Jacobs |
| 4,680,214 A | 7/1987 | Frisch et al. |
| 4,714,778 A | 12/1987 | Burgoyne, Jr. et al. |
| 4,717,027 A | 1/1988 | Laure et al. |
| 4,728,287 A | 3/1988 | Niems |
| 4,728,288 A | 3/1988 | Niems |
| 4,737,524 A | 4/1988 | Ako et al. |
| 4,757,095 A | 7/1988 | Galan et al. |
| 4,758,602 A | 7/1988 | Trowell |
| 4,780,484 A | 10/1988 | Schubert et al. |
| 4,780,498 A | 10/1988 | Goerrissen et al. |
| 4,795,763 A | 1/1989 | Gluck et al. |
| 4,802,769 A | 2/1989 | Tanaka |
| 4,823,195 A | 4/1989 | Ito |
| 4,826,429 A | 5/1989 | Niems |
| 4,826,944 A | 5/1989 | Hoefer et al. |
| 4,832,183 A | 5/1989 | Hoefer et al. |
| 4,835,195 A | 5/1989 | Rayfield et al. |
| 4,855,184 A | 8/1989 | CloseKlun et al. |
| 4,892,891 A | 1/1990 | Close |
| 4,895,352 A | 1/1990 | Stump |
| 4,948,859 A | 8/1990 | Echols et al. |
| 4,995,801 A | 2/1991 | Hehl |
| 5,001,165 A | 3/1991 | Canaday et al. |
| 5,010,112 A | 4/1991 | Glicksman et al. |
| 5,028,648 A | 7/1991 | Famili et al. |

(56) References Cited

U.S. PATENT DOCUMENTS

| | | |
|---|---|---|
| 5,033,860 A | 7/1991 | Nakamura |
| 5,047,495 A | 9/1991 | Kolycheck |
| 5,051,222 A | 9/1991 | Marten et al. |
| 5,053,274 A | 10/1991 | Jonas |
| 5,064,293 A | 11/1991 | Nakamura |
| 5,075,417 A | 12/1991 | Trowell et al. |
| 5,091,436 A | 2/1992 | Frisch et al. |
| 5,094,798 A | 3/1992 | Hewitt |
| 5,096,993 A | 3/1992 | Smith et al. |
| 5,102,918 A | 4/1992 | Moriya |
| 5,102,969 A | 4/1992 | Scheffler et al. |
| 5,114,630 A | 5/1992 | Newman et al. |
| 5,128,379 A | 7/1992 | Stone |
| 5,149,722 A | 9/1992 | Soukup |
| 5,149,739 A | 9/1992 | Lee |
| 5,159,012 A | 10/1992 | Doesburg et al. |
| 5,166,301 A | 11/1992 | Jacobs |
| 5,167,899 A | 12/1992 | Jezic |
| 5,185,420 A | 2/1993 | Smith et al. |
| 5,186,539 A | 2/1993 | Manser et al. |
| 5,229,138 A | 7/1993 | Carotti |
| 5,252,697 A | 10/1993 | Jacobs et al. |
| 5,271,699 A | 12/1993 | Barre et al. |
| 5,278,195 A | 1/1994 | Volkert et al. |
| 5,295,545 A | 3/1994 | Passamaneck |
| 5,296,545 A | 3/1994 | Heise |
| 5,296,546 A | 3/1994 | Kishida et al. |
| 5,300,531 A | 4/1994 | Weaver |
| 5,302,634 A | 4/1994 | Mushovic |
| 5,330,341 A | 7/1994 | Kemerer et al. |
| 5,331,044 A | 7/1994 | Lausberg et al. |
| 5,340,300 A | 8/1994 | Saeki et al. |
| 5,344,490 A | 9/1994 | Roosen et al. |
| 5,361,945 A | 11/1994 | Johanson |
| 5,369,147 A | 11/1994 | Mushovic |
| 5,375,988 A | 12/1994 | Klahre |
| 5,401,785 A | 3/1995 | Kumagai et al. |
| 5,424,013 A | 6/1995 | Lieberman |
| 5,424,014 A | 6/1995 | Glorioso et al. |
| 5,432,204 A | 7/1995 | Farkas |
| 5,439,711 A | 8/1995 | Vu et al. |
| 5,451,615 A | 9/1995 | Birch |
| 5,453,231 A | 9/1995 | Douglas |
| 5,455,312 A | 10/1995 | Heidingsfeld et al. |
| 5,458,477 A | 10/1995 | Kemerer et al. |
| 5,489,646 A | 2/1996 | Tatman et al. |
| 5,491,174 A | 2/1996 | Grier et al. |
| 5,495,640 A | 3/1996 | Mullet et al. |
| 5,505,599 A | 4/1996 | Kemerer et al. |
| 5,508,315 A | 4/1996 | Mushovic |
| 5,512,319 A | 4/1996 | Cook et al. |
| 5,514,430 A | 5/1996 | Andersen et al. |
| 5,522,446 A | 6/1996 | Mullet et al. |
| 5,527,172 A | 6/1996 | Graham, Jr. |
| 5,532,065 A | 7/1996 | Gubitz et al. |
| 5,536,781 A | 7/1996 | Heidingsfeld et al. |
| 5,554,713 A | 9/1996 | Freeland |
| 5,562,141 A | 10/1996 | Mullet et al. |
| 5,565,497 A | 10/1996 | Godbey et al. |
| 5,566,740 A | 10/1996 | Mullet et al. |
| 5,567,791 A | 10/1996 | Br auer et al. |
| 5,569,713 A | 10/1996 | Lieberman |
| 5,582,840 A | 12/1996 | Pauw et al. |
| 5,582,849 A | 12/1996 | Lupke |
| 5,604,266 A | 2/1997 | Mushovic |
| 5,611,976 A | 3/1997 | Klier et al. |
| 5,621,024 A | 4/1997 | Eschbach et al. |
| 5,631,103 A | 5/1997 | Eschbach et al. |
| 5,631,319 A | 5/1997 | Reese et al. |
| 5,634,953 A | 6/1997 | Wissmann |
| 5,643,516 A | 7/1997 | Raza et al. |
| 5,681,915 A | 10/1997 | Lechner et al. |
| 5,688,890 A | 11/1997 | Ishiguro et al. |
| 5,700,495 A | 12/1997 | Kemerer et al. |
| 5,710,231 A | 1/1998 | Fogg et al. |
| 5,721,699 A | 2/1998 | DeVilbiss |
| 5,723,506 A | 3/1998 | Glorioso et al. |
| 5,728,337 A | 3/1998 | Yoshikawa et al. |
| 5,759,695 A | 6/1998 | Dudley |
| 5,760,133 A | 6/1998 | Heidingsfeld et al. |
| 5,769,281 A | 6/1998 | Bates |
| 5,782,283 A | 7/1998 | Kendall |
| 5,783,125 A | 7/1998 | Bastone et al. |
| 5,783,629 A | 7/1998 | Srinivasan et al. |
| 5,791,085 A | 8/1998 | Szmidt et al. |
| 5,795,949 A | 8/1998 | Daute et al. |
| 5,798,533 A | 8/1998 | Fishback et al. |
| 5,811,506 A | 9/1998 | Slagel |
| 5,817,402 A | 10/1998 | Miyake et al. |
| 5,836,499 A | 11/1998 | Mullet et al. |
| 5,844,015 A | 12/1998 | Steilen et al. |
| 5,862,144 A | 1/1999 | Lee et al. |
| 5,908,573 A | 6/1999 | Chiles et al. |
| 5,908,701 A | 6/1999 | Jennings et al. |
| 5,929,153 A | 7/1999 | Mori et al. |
| 5,934,352 A | 8/1999 | Morgan |
| 5,945,460 A | 8/1999 | Ekart et al. |
| 5,952,053 A | 9/1999 | Colby |
| 5,962,144 A | 10/1999 | Dudley |
| 5,981,655 A | 11/1999 | Heidingsfeld et al. |
| 6,000,102 A | 12/1999 | Lychou |
| 6,019,269 A | 2/2000 | Mullet et al. |
| 6,020,387 A | 2/2000 | Downey et al. |
| 6,040,381 A | 3/2000 | Jennings et al. |
| 6,044,512 A | 4/2000 | Hornby et al. |
| 6,051,634 A | 4/2000 | Laas et al. |
| 6,055,781 A | 5/2000 | Johanson |
| 6,060,531 A | 5/2000 | Horn et al. |
| 6,062,719 A | 5/2000 | Busby et al. |
| 6,086,802 A | 7/2000 | Levera et al. |
| 6,096,401 A | 8/2000 | Jenkines |
| 6,103,340 A | 8/2000 | Kubo et al. |
| 6,107,355 A | 8/2000 | Horn et al. |
| 6,107,433 A | 8/2000 | Petrovic et al. |
| 6,120,905 A | 9/2000 | Figovsky |
| 6,136,246 A | 10/2000 | Rauwendaal et al. |
| 6,136,870 A | 10/2000 | Triolo et al. |
| 6,140,381 A | 10/2000 | Rosthauser et al. |
| 6,166,109 A | 12/2000 | Spitler et al. |
| 6,177,232 B1 | 1/2001 | Melisaris et al. |
| 6,180,192 B1 | 1/2001 | Smith et al. |
| 6,180,686 B1 | 1/2001 | Kurth |
| RE37,095 E | 3/2001 | Glorioso et al. |
| 6,204,312 B1 | 3/2001 | Taylor |
| 6,211,259 B1 | 4/2001 | Borden et al. |
| 6,220,745 B1 | 4/2001 | Kobayashi et al. |
| 6,224,797 B1 | 5/2001 | Franzen et al. |
| 6,234,777 B1 | 5/2001 | Sperry et al. |
| 6,252,031 B1 | 6/2001 | Tsutsumi et al. |
| 6,257,643 B1 | 7/2001 | Young |
| 6,257,644 B1 | 7/2001 | Young |
| 6,258,310 B1 | 7/2001 | Sardanopoli et al. |
| 6,258,917 B1 | 7/2001 | Slagel |
| 6,264,462 B1 | 7/2001 | Gallagher |
| 6,271,276 B1 | 8/2001 | Gribble et al. |
| 6,284,841 B1 | 9/2001 | Friesner |
| 6,294,637 B1 | 9/2001 | Braüer et al. |
| 6,297,321 B1 | 10/2001 | Onder et al. |
| 6,309,507 B1 | 10/2001 | Morikawa et al. |
| 6,312,244 B1 | 11/2001 | Levera et al. |
| 6,321,904 B1 | 11/2001 | Mitchell |
| 6,329,448 B1 | 12/2001 | Gutsche et al. |
| 6,331,577 B1 | 12/2001 | Volkert et al. |
| 6,343,924 B1 | 2/2002 | Klepsch |
| 6,348,514 B1 | 2/2002 | Calabrese et al. |
| 6,362,252 B1 | 3/2002 | Prutkin |
| 6,383,599 B1 | 5/2002 | Bell et al. |
| 6,387,504 B1 | 5/2002 | Mushovic |
| 6,409,949 B1 | 6/2002 | Tanaka et al. |
| 6,422,926 B1 | 7/2002 | McLain et al. |
| 6,429,257 B1 | 8/2002 | Buxton et al. |
| 6,432,335 B1 | 8/2002 | Ladang et al. |
| 6,433,032 B1 | 8/2002 | Hamilton |
| 6,433,121 B1 | 8/2002 | Petrovic et al. |

(56) References Cited

U.S. PATENT DOCUMENTS

| | | |
|---|---|---|
| 6,455,605 B1 | 9/2002 | Giorgini et al. |
| 6,455,606 B1 | 9/2002 | Kaku et al. |
| 6,458,866 B1 | 10/2002 | Oppermann et al. |
| 6,465,569 B1 | 10/2002 | Kurth |
| 6,467,610 B1 | 10/2002 | MacLachlan |
| 6,469,667 B2 | 10/2002 | Fox et al. |
| 6,485,665 B1 | 11/2002 | Hermanutz et al. |
| 6,486,224 B2 | 11/2002 | Lin et al. |
| 6,495,772 B2 | 12/2002 | Anstrom et al. |
| 6,534,617 B1 | 3/2003 | Batt et al. |
| 6,541,534 B2 | 4/2003 | Allen et al. |
| 6,552,660 B1 | 4/2003 | Lisowski |
| 6,555,199 B1 | 4/2003 | Jenkines |
| 6,571,935 B1 | 6/2003 | Campbell et al. |
| 6,573,309 B1 | 6/2003 | Reitenbach et al. |
| 6,573,354 B1 | 6/2003 | Petrovic et al. |
| 6,578,619 B2 | 6/2003 | Wright |
| 6,579,932 B1 | 6/2003 | Schipper et al. |
| 6,586,490 B1 | 7/2003 | Dietrich et al. |
| 6,604,848 B2 | 8/2003 | Tanaka et al. |
| 6,605,343 B1 | 8/2003 | Motoi et al. |
| 6,609,638 B1 | 8/2003 | Lott |
| 6,613,823 B1 | 9/2003 | Battiste et al. |
| 6,613,827 B2 | 9/2003 | Lundgard et al. |
| 6,616,886 B2 | 9/2003 | Peterson et al. |
| 6,617,009 B1 | 9/2003 | Chen et al. |
| 6,624,244 B2 | 9/2003 | Kurth |
| 6,641,384 B2 | 11/2003 | Bosler et al. |
| 6,641,658 B1 | 11/2003 | Dubey |
| 6,649,084 B2 | 11/2003 | Morikawa et al. |
| 6,649,667 B2 | 11/2003 | Clatty |
| 6,686,435 B1 | 2/2004 | Petrovic et al. |
| 6,695,902 B2 | 2/2004 | Hemmings et al. |
| 6,706,774 B2 | 3/2004 | Münzenberger et al. |
| 6,767,399 B2 | 7/2004 | Peev et al. |
| 6,769,220 B2 | 8/2004 | Friesner |
| 6,832,430 B1 | 12/2004 | Ogawa et al. |
| 6,841,111 B2 | 1/2005 | Rickner et al. |
| 6,849,676 B1 | 2/2005 | Shibano et al. |
| 6,855,844 B1 | 2/2005 | Geiger et al. |
| 6,864,296 B2 | 3/2005 | Kurth |
| 6,867,239 B2 | 3/2005 | Kurth |
| 6,871,457 B2 | 3/2005 | Quintero-Flores et al. |
| 6,881,763 B2 | 4/2005 | Kurth |
| 6,881,764 B2 | 4/2005 | Blum et al. |
| 6,903,156 B2 | 6/2005 | Müller et al. |
| 6,908,573 B2 | 6/2005 | Hossan |
| 6,916,863 B2 | 7/2005 | Hemmings et al. |
| 6,958,365 B2 | 10/2005 | Dontula et al. |
| 6,962,636 B2 | 11/2005 | Kurth et al. |
| 6,971,495 B2 | 12/2005 | Hedrick et al. |
| 6,979,477 B2 | 12/2005 | Kurth et al. |
| 6,979,704 B1 | 12/2005 | Mayer et al. |
| 6,989,123 B2 | 1/2006 | Lee et al. |
| 6,997,346 B2 | 2/2006 | Landers et al. |
| 7,063,877 B2 | 6/2006 | Kurth et al. |
| 7,132,459 B1 | 11/2006 | Buchel |
| 7,160,976 B2 | 1/2007 | Lüthmann et al. |
| 7,188,992 B2 | 3/2007 | Mattingly, Jr. |
| 7,196,124 B2 | 3/2007 | Parker et al. |
| 7,211,206 B2 | 5/2007 | Brown et al. |
| 7,267,288 B2 | 9/2007 | Wheeler, Jr. et al. |
| 7,316,559 B2 | 1/2008 | Taylor |
| 7,316,659 B2 | 1/2008 | Lofberg |
| 7,491,351 B2 | 2/2009 | Taylor et al. |
| 7,579,068 B2 | 8/2009 | Allen et al. |
| 7,651,645 B2 | 1/2010 | Taylor |
| 7,763,341 B2 * | 7/2010 | Brown ............... C08G 18/0895 428/151 |
| 7,776,934 B2 | 8/2010 | Lekovic et al. |
| 7,794,224 B2 | 9/2010 | Butteriss |
| 7,794,817 B2 | 9/2010 | Brown |
| 8,024,818 B1 | 9/2011 | Devenport |
| 8,030,364 B2 | 10/2011 | Kim et al. |
| 8,088,217 B2 | 1/2012 | Francis |
| 8,114,267 B2 | 2/2012 | Nordlinder |
| 8,177,909 B2 | 5/2012 | Constantz et al. |
| 8,227,656 B2 | 7/2012 | Svetlik |
| 8,313,802 B2 | 11/2012 | Riman et al. |
| 2001/0009683 A1 | 7/2001 | Kithama et al. |
| 2002/0034598 A1 | 3/2002 | Bonk et al. |
| 2002/0040071 A1 | 4/2002 | Lin et al. |
| 2002/0045048 A1 | 4/2002 | Bonk et al. |
| 2002/0048643 A1 | 4/2002 | Bonk et al. |
| 2002/0086913 A1 | 7/2002 | Roels et al. |
| 2002/0098362 A1 | 7/2002 | Mushovic |
| 2002/0119300 A1 | 8/2002 | Taylor |
| 2002/0122929 A1 | 9/2002 | Simpson et al. |
| 2002/0171164 A1 | 11/2002 | Halterbaum et al. |
| 2002/0192456 A1 | 12/2002 | Mashburn et al. |
| 2003/0004232 A1 | 1/2003 | Ruede |
| 2003/0021915 A1 | 1/2003 | Rohatgi et al. |
| 2003/0047836 A1 | 3/2003 | Rickner et al. |
| 2003/0065045 A1 | 4/2003 | Falke et al. |
| 2003/0083394 A1 | 5/2003 | Clatty |
| 2003/0090016 A1 | 5/2003 | Petrovic et al. |
| 2003/0143910 A1 | 7/2003 | Mashburn et al. |
| 2003/0158365 A1 | 8/2003 | Brauer et al. |
| 2003/0166735 A1 | 9/2003 | Clatty |
| 2003/0232933 A1 | 12/2003 | Lagneaux et al. |
| 2004/0014830 A1 | 1/2004 | Wiese et al. |
| 2004/0048055 A1 | 3/2004 | Branca |
| 2004/0049002 A1 | 3/2004 | Andrews et al. |
| 2004/0121161 A1 | 6/2004 | Shugert et al. |
| 2004/0122119 A1 | 6/2004 | Burgess et al. |
| 2004/0144287 A1 | 7/2004 | Tardif et al. |
| 2004/0162360 A1 | 8/2004 | Kiso et al. |
| 2004/0176486 A1 | 9/2004 | Glorioso et al. |
| 2004/0198900 A1 | 10/2004 | Madaj |
| 2004/0247857 A1 | 12/2004 | Schroeder et al. |
| 2004/0266993 A1 | 12/2004 | Evans |
| 2005/0011159 A1 | 1/2005 | Standal et al. |
| 2005/0013793 A1 | 1/2005 | Beckman et al. |
| 2005/0031578 A1 | 2/2005 | Deslauriers et al. |
| 2005/0032925 A1 | 2/2005 | Kaplan |
| 2005/0070620 A1 | 3/2005 | Herrington et al. |
| 2005/0079339 A1 | 4/2005 | Riddle |
| 2005/0131092 A1 | 6/2005 | Kurth et al. |
| 2005/0131093 A1 | 6/2005 | Kurth et al. |
| 2005/0161855 A1 | 7/2005 | Brown |
| 2005/0163939 A1 | 7/2005 | Moehl et al. |
| 2005/0163969 A1 | 7/2005 | Brown |
| 2005/0171243 A1 | 8/2005 | Hemmings et al. |
| 2005/0182228 A1 | 8/2005 | Kurth |
| 2005/0197413 A1 | 9/2005 | Grimm et al. |
| 2005/0208167 A1 | 9/2005 | You et al. |
| 2005/0222303 A1 | 10/2005 | Cernohous et al. |
| 2005/0260351 A1 | 11/2005 | Kurth et al. |
| 2005/0281999 A1 | 12/2005 | Hofmann et al. |
| 2005/0287238 A1 | 12/2005 | Taylor |
| 2006/0003042 A1 | 1/2006 | Inoue et al. |
| 2006/0011159 A1 | 1/2006 | Bloms et al. |
| 2006/0014891 A1 | 1/2006 | Yang et al. |
| 2006/0041155 A1 | 2/2006 | Casper |
| 2006/0041156 A1 | 2/2006 | Casper et al. |
| 2006/0045899 A1 | 3/2006 | Sarangapani et al. |
| 2006/0071369 A1 | 4/2006 | Butteriss |
| 2006/0105145 A1 | 5/2006 | Brown |
| 2006/0115625 A1 | 6/2006 | Brown |
| 2006/0131791 A1 | 6/2006 | Nakamura et al. |
| 2006/0186571 A1 | 8/2006 | Brown |
| 2006/0186572 A1 | 8/2006 | Brown |
| 2006/0217517 A1 | 9/2006 | Daly |
| 2006/0235100 A1 | 10/2006 | Kaushiva et al. |
| 2006/0270747 A1 | 11/2006 | Griggs |
| 2006/0273486 A1 | 12/2006 | Taylor et al. |
| 2007/0022106 A1 | 1/2007 | Brandt et al. |
| 2007/0027227 A1 | 2/2007 | Shutov |
| 2007/0037953 A1 | 2/2007 | Geiger et al. |
| 2007/0052128 A1 | 3/2007 | Taylor |
| 2007/0056875 A1 | 3/2007 | Hlady et al. |
| 2007/0066697 A1 | 3/2007 | Gilder et al. |
| 2007/0197672 A1 | 8/2007 | Lekovic et al. |
| 2007/0222105 A1 | 9/2007 | Brown |

(56) References Cited

U.S. PATENT DOCUMENTS

| | | |
|---|---|---|
| 2007/0222106 A1 | 9/2007 | Brown |
| 2007/0225391 A1 | 9/2007 | Brown |
| 2007/0225419 A1 | 9/2007 | Brown |
| 2007/0261947 A1 | 11/2007 | Geerlings et al. |
| 2008/0029925 A1 | 2/2008 | Brown |
| 2008/0119578 A1 | 5/2008 | Prince et al. |
| 2008/0132611 A1 | 6/2008 | Brown |
| 2008/0237914 A1 | 10/2008 | Lustiger et al. |
| 2008/0241458 A1 | 10/2008 | Jenkines |
| 2009/0069117 A1 | 3/2009 | Kennedy et al. |
| 2009/0198036 A1 | 8/2009 | Duffy |
| 2009/0295021 A1 | 12/2009 | Brown |
| 2010/0022717 A1 | 1/2010 | Honma |
| 2010/0025882 A1 | 2/2010 | Taylor et al. |
| 2010/0201014 A1 | 8/2010 | Taylor |
| 2010/0230852 A1 | 9/2010 | Brown |
| 2010/0264559 A1 | 10/2010 | Brown |
| 2010/0292397 A1 | 11/2010 | Brown |
| 2010/0296361 A1 | 11/2010 | Brown |
| 2011/0059319 A1 | 3/2011 | Raday |
| 2011/0086934 A1 | 4/2011 | Herrington et al. |
| 2011/0182799 A1 | 7/2011 | Riman et al. |
| 2011/0303156 A1 | 12/2011 | Sikka et al. |
| 2012/0029145 A1 | 2/2012 | Brown |
| 2012/0085264 A1 | 4/2012 | Zhang et al. |
| 2012/0312194 A1 | 12/2012 | Riman et al. |
| 2013/0065980 A1 | 3/2013 | Yoshitomi |
| 2013/0072588 A1 | 3/2013 | Rosthauser et al. |
| 2013/0059934 A1 | 5/2013 | Burgess et al. |
| 2013/0122267 A1 | 5/2013 | Riman et al. |
| 2013/0206040 A1 | 8/2013 | Zhang et al. |
| 2013/0284069 A1 | 10/2013 | Dubey |
| 2013/0284070 A1 | 10/2013 | Dubey |
| 2016/0052168 A1 | 2/2016 | Li |
| 2016/0053078 A1 | 2/2016 | Ashish et al. |

FOREIGN PATENT DOCUMENTS

| | | |
|---|---|---|
| CN | 1052991 | 5/2000 |
| CN | 1926282 | 3/2007 |
| DE | 2351844 | 4/1975 |
| EP | 115374 | 8/1984 |
| EP | 0654297 | 5/1995 |
| EP | 0771827 | 5/1997 |
| EP | 1336461 | 5/2002 |
| GB | 1152306 | 5/1969 |
| GB | 1246940 | 9/1971 |
| GB | 1314707 | 4/1973 |
| GB | 2300627 | 11/1996 |
| GB | 2347933 | 9/2000 |
| JP | 355080456 | 6/1980 |
| JP | 58-132533 | 8/1983 |
| JP | 63-022819 | 1/1988 |
| JP | 63-202408 | 8/1988 |
| JP | 07-076395 | 3/1995 |
| JP | 07-313941 | 12/1995 |
| JP | 08-188634 | 7/1996 |
| JP | 11-171960 | 6/1999 |
| JP | 2001-326361 | 11/2001 |
| JP | 2004-131654 | 4/2004 |
| JP | 2005-138567 | 6/2005 |
| KR | 2002-0086327 | 11/2002 |
| NZ | 226301 | 3/1990 |
| WO | 1981/03026 | 10/1981 |
| WO | 1987/05541 | 9/1987 |
| WO | 1991/00304 | 1/1991 |
| WO | 1992/07892 | 5/1992 |
| WO | 1993/19110 | 9/1993 |
| WO | 1993/24549 | 12/1993 |
| WO | 1994/25529 | 11/1994 |
| WO | 1994/27697 | 12/1994 |
| WO | 1997/11114 | 3/1997 |
| WO | 1997/44373 | 11/1997 |
| WO | 1998/08893 | 3/1998 |
| WO | 1999/37592 | 1/1999 |
| WO | 1999/39891 | 8/1999 |
| WO | 2000/17249 | 3/2000 |
| WO | 2001/018087 | 3/2001 |
| WO | 2001/72863 | 10/2001 |
| WO | 2001/85140 | 11/2001 |
| WO | 2002/01530 | 1/2002 |
| WO | 2002/068490 | 9/2002 |
| WO | 2004/078900 | 9/2004 |
| WO | 2004/113248 | 12/2004 |
| WO | 2005/053938 | 6/2005 |
| WO | 2005/056267 | 6/2005 |
| WO | 2005/072187 | 8/2005 |
| WO | 2005/072188 | 8/2005 |
| WO | 2005/094255 | 10/2005 |
| WO | 2005/123798 | 12/2005 |
| WO | 2006/012149 | 2/2006 |
| WO | 2006/137672 | 12/2006 |
| WO | 2007/112104 | 10/2007 |
| WO | 2007/112105 | 10/2007 |
| WO | 2013/049401 | 4/2013 |

OTHER PUBLICATIONS

Guo et al., "Polyols and Polyurethanes from Hydroformylation of Soybean Oil," Journal of Polymers and the Environment 10(1-2):49-52 (Apr. 2002).

Guo et al., "Rigid Urethane Foams from a Soy Polyol-Dod Hybrid," USDA Agricultural Research Service, http://ars.usda.gov/research/publications/publications.htm?SEQ-NO-115=145249 (May 9, 2003).

Hojabri et al., "Fatty Acid-Derived Diisocyanate and Biobased Polyurethane Produced from Vegetable Oil: Synthesis, Polymerization, and Characterization," Biomacromolecules, 10(4):884-891 (2009), abstract.

Ionescu, "Chemistry and Technology of Polyols for Polyurethanes," Rapra Technology Ltd,. (2005), pp. 535-550.

Inukai et al., "Glass Fiber Reinforced Rigid Polyurethane Foam (Elson Neo-Lumber FFU)," International Progress in Urethanes, vol. 5, Lancaster, PA, Technomic Publishing Co., Inc., 1988.

Javni, I. et al., "Thermal Stability of Polyurethanes Based on Vegetable Oils," Journal of Applied Polymer Science, 77:1723-1734 (2000).

Klempner, D., ed., et al., Excerpts from Handbook of Polymeric Foams and Foam Technology, 2d ed., 2004, pp. 121-124, 126, 128, 129, Hanser Publishers, Munich.

Krishnamurthi, B, et al.., Nano- and Micro-Fillers for Polyurethane Foams: Effect on Density and Mechanical Properties, Symposium, Sep. 30-Oct. 3, 2001, pp. 239-244, Polyurethanes Expo 2001, Columbus, OH.

Morimoto et al., "Continuous Glass Fiber Reinforced Rigid Polyurethane Foam (Airlite FRU)," International Progress in Urethanes, vol. 5, Lancaster, PA, Technomic Publishing Co., Inc., 1988.

National Center for Environmental Research and Quality Assurance, Office of Research and Development, U.S. Environmental Protection Agency, Abstract of "The Use of Multi-Component Waste Products for Use in Roofing Materials," May 9, 1998.

Nayak, P.L., "Natural Oil-Based Polymers: Opportunities and Challenges," J. Macro. Sci. Rev. Macro. Chem. & Phys., C40(1):1-21 (2000).

Nosker, Thomas J., et al., Fiber Orientation and Creation of Structural Plastic Lumber, Plastics Engineering, Jun. 1999, pp. 53-56.

Oertel, G., ed., Polyurethane Handbook Second Edition, pp. 136, 182-183, 252-253; Carl Hanser, Verlag, Munich (1994).

Okagawa et al., "Glass Fiber Reinforced Rigid Polyurethane Foam," Cellular and non cellular polyurethanes, Carl Hanser Verlag Munchen Wien Druck und Bindung, Germany, p. 453-467, 1980.

Okagawa, F., "Glass Fiber Reinforced Rigid Polyurethane Foam", International Progress in Urethane, vol. 2, Lancaster, PA, Technomic Publishing Co., Inc., 1980.

OSi Specialties, "Fomrez Tin Catalysts", 3 pages.

Petrovic et al., "Industrial Oil Products Program," AOCS Archives, (2007).

Pollack, "Soy vs. Petro Polyols a Life-Cycle Comparison," Omni Tech International, Ltd. (2002).

(56) References Cited

OTHER PUBLICATIONS

Rama, Shetty R. et al., Journal of Reinforced Plastics and Composites, 2010, 29:2099-2104 (Abstract).
Randall, D., ed., et. al., Excerpts from "The polyurethanes book", 2002, pp. 1, 166-167, 210-213, 229-231, 263-264, Dunholm Publicity Ltd., United Kingdom.
Shutov, F.A., Excerpts from Integral/Structural Polymer Foams: Technology, Properties and Applications, 1986, Pages including preface, 3-4, 8-9, 13, 23-25, 131-134, 153-158, 167, 171, 176-179, 256.
Soya-based isocyanate alternatives coming? (US Newslines), Apr. 1, 2007.
Standard Practice for Polyurethane Raw Materials: Polyurethane Foam Cup Test, ASTM D7487-08, 2008.
Szycher, Michael. 17.7.1 Foam Production by Extruder Method. Szycher's Handbook of Polyurethanes. pp. 17-21-17-22. Copyright 1999 by CRC Press LLC.
Woods, G., Excerpts from "The ICI Polyurethanes Book", 1987, pp. 119-120, 127, 135-140, 158-159, The Netherlands.
Wypych, G., Excerpts from "Fillers", 1993, pp. 4, 48, 57, ChemTech Publishing, Ontario Canada.
Anonymous. "Rigid polyurethane foams having a strut/window mass ratio in the range of 90/10 to 10/90, made via extrusion." Research Disclosure. Journal No. 40264, Published Oct. 1997.
Anonymous. "Cellular plastics made by extrusion." Research Disclosure. Journal No. 40204, Published Oct. 1997.
Bayer Material Science Product Information, Multranol 3900, Jan. 2006.
Bayer Material Science, Arcol LG-56-Polyether Polyol, CAS No. 25791-96-2, Product Code: KLLG56 (2003).
Bayer Material Science, Multranol 4035—Polyether Polyol, CAS No. 9049-71-2, Product Code: K114 (1997).
Bledzki, Andrzej K., et al., Impact Properties of Natural Fiber-Reinforced Epoxy Foams, Journal of Cellular Plastics, vol. 35, Nov. 1999, pp. 550-562.
Cayli et al., "Soybean Oil Based Isocyanates: Synthesis, Characterizations, and Polymerizations," Conference Abstract, 2nd Workshop on Fats and Oils as Renewable Feedstock for the Chemical Industry, Mar. 22-24, 2009.
Dolui, S.K., "Unusual effect of filler ($CaCO_3$) on thermal degradation of polyurethane," Journal of Applied Polymer Science, 53(4): 463-465 (2003).

\* cited by examiner

HIGHLY FILLED POLYURETHANE COMPOSITES

TECHNICAL FIELD

This application generally relates to highly filed polyurethane composites, as well as methods of making and using thereof.

BACKGROUND

Polymeric composite materials that include organic and/or inorganic fillers have become desirable for a variety of uses because of their excellent mechanical properties and weathering stability. Foamed versions of these materials can have a relatively low density yet the filler materials can provide a composite material that is extremely strong. The polymer provided in the composite material can help provide good toughness (i.e., resistance to brittle fracture) and resistance to degradation from weathering to the composite when it is exposed to the environment. Thus, polymeric composite materials including organic and/or inorganic fillers can be used in a variety of applications, including in building materials.

While these types of polymeric composites have been successfully used in a variety of applications, a need still exists for polymeric composites with improved mechanical properties (e.g., improved flexural strength).

SUMMARY

Polyurethane composites include a polyurethane formed by the reaction of one or more isocyanates and one or more polyols, and a filler dispersed throughout the polyurethane. Generally, the selection of the one or more polyols used to form the polyurethane can influence the physical and mechanical properties of the resulting polymeric composite.

For example, polyols are often classified as either rigid polyols or flexible polyols based on various properties of the individual polyol and the overall flexibility of a polyurethane polymer produced from the respective polyols. Generally speaking, the rigidity or flexibility of a polyurethane formed from any single polyol is governed by one or more of the hydroxyl number, functionality, and molecular weight of the polyol. Rigid polyols typically have a high hydroxyl number (e.g., a hydroxyl number of greater than 175 mg KOH/g), a high functionality (e.g., a functionality greater than 3.5), and/or a low molecular weight (e.g., a molecular weight of 1,000 Daltons or less). Flexible polyols typically have a lower hydroxyl number (e.g., a hydroxyl number of less than 150 mg KOH/g), a lower functionality (e.g., a functionality of 3 or less), and/or a higher molecular weight (e.g., a molecular weight of at greater than 1,000 Daltons).

When preparing polyurethane composites, the relative amount of rigid polyol(s) in the polyol blend used to form the polyurethane is generally carefully controlled in order to ensure that the resulting composite is not too brittle. Typically, from about 5% by weight to about 20% by weight (more particularly around 15% by weight) of one or more flexible polyols, based on the total weight of the polyol blend used to form the polyurethane, is combined with from about 80% by weight to about 95% by weight (more particularly around 85% by weight) of one or more rigid polyols, based on the total weight of the polyol blend used to form the polyurethane, to afford a composite having physical and mechanical properties (e.g., flexural strength) suitable for many structural applications.

Surprisingly, it has been discovered that when preparing highly filed polyurethane composites (e.g., composites that include from 35% to 90% by weight particulate filler, based on the total weight of the composition), composite materials having a high flexural strength can be prepared without incorporating one or more flexible polyols in the polyol blend used to form the polyurethane. Specifically, composite materials having a high flexural strength can be prepared from polyol blends that include less than 5% by weight of one or more flexible polyols, based on the total weight of the polyol blend used to form the polyurethane.

Accordingly, provided herein are composite materials. The composite materials can comprise (a) a polyurethane formed by the reaction of (i) one or more isocyanates selected from the group consisting of diisocyanates, polyisocyanates, and mixtures thereof, and (ii) one or more polyols; and (b) a particulate filler. The composites can exhibit a high flexural strength. For example, the composites can exhibit a normalized flexural strength of at least 20 (e.g., a normalized flexural strength of from 20 to 50, or a normalized flexural strength of from 25 to 35).

The one or more polyols that form the polyurethane can comprise one or more high hydroxyl number polyols (e.g., one or more rigid polyols) having a hydroxyl number of at least 250 mg KOH/g. In some embodiments, the one or more polyols that form the polyurethane comprise at least 95% by weight (e.g., at least 99% by weight), based on the total weight of the polyols that form the polyurethane, one or more high hydroxyl number polyols (e.g., one or more rigid polyols) having a hydroxyl number of at least 250 mg KOH/g. In certain embodiments, the one or more polyols that form the polyurethane consist of one or more high hydroxyl number polyols (e.g., one or more rigid polyols) having a hydroxyl number of at least 250 mg KOH/g.

In some embodiments, the one or more polyols that form the polyurethane include less than 5% by weight (e.g., less than 1% by weight), based on the total weight of the one or more polyols that form the polyurethane, of one or more flexible polyols having a hydroxyl number of less than 150 and a functionality of less than 3.

In some embodiments, the one or more polyols that form the polyurethane can have a weight average equivalent weight of from 200 to 1100 amu (e.g., a weight average equivalent weight of from 200 to 600 amu, from 200 to 300 amu, or from 200 to 250 amu).

In some cases, the one or more polyols that form the polyurethane satisfy Eq. 1 below $$(2.1)(F)+(0.3)(EW)-(0.0036)(F)(EW) \geq 12 \qquad \text{Eq. 1}$$

wherein F is the weight average functionality of the one or more polyols that form the polyurethane; and EW is the weight average equivalent weight of the one or more polyols that form the polyurethane. In certain cases, the one or more polyols that form the polyurethane satisfy Eq. 2 below $$(2.1)(F)+(0.3)(EW)-(0.0036)(F)(EW) \geq 15 \qquad \text{Eq. 2}$$

wherein F is the weight average functionality of the one or more polyols that form the polyurethane; and EW is the weight average equivalent weight of the one or more polyols that form the polyurethane.

The particulate filler can be an inorganic filler, such as fly ash. In some embodiments, the total amount of particulate filler in the composite material can range from 35% to 90% by weight (from 45% to 70% by weight), based on the total weight of the composition.

Also provided are methods of preparing the composite materials described herein. The methods can include mixing (1) a particulate filler; (2) at least one isocyanate selected from the group consisting of diisocyanates, polyisocyanates, and combinations thereof; (3) one or more polyols; and (4) a catalyst. The at least one isocyanate and the one or more polyols are then allowed to react in the presence of the particulate filler and catalyst to form the composite material.

DETAILED DESCRIPTION

Figure 1:
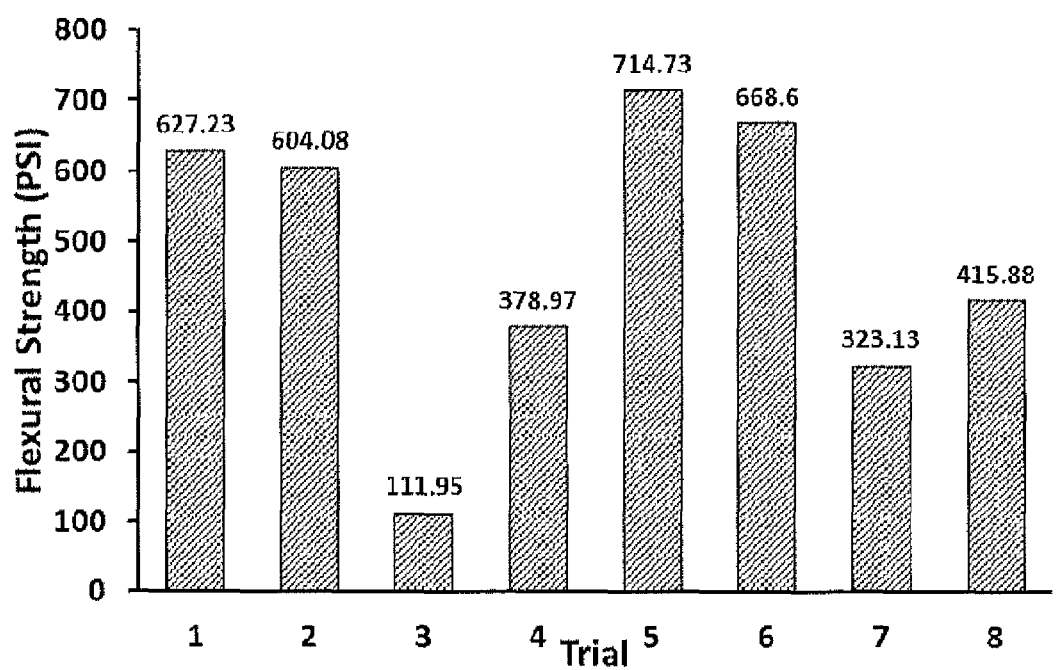
FIG. 1 is a plot illustrating the flexural strength of composites 1-8.

Composite materials and methods for their preparation are described herein.

The composite materials can comprise (a) a polyurethane formed by the reaction of (1) one or more isocyanates selected from the group consisting of diisocyanates, polyisocyanates, and mixtures thereof, and (ii) one or more polyols; and (b) a particulate filler.

The composites can exhibit a high normalized flexural strength. For example, in some embodiments, the composites can exhibit a normalized flexural strength of at least 20 (e.g., at least 21, at least 22, at least 23, at least 24, at least 25, at least 26, at least 27, at least 28, at least 29, at least 30, at least 31, at least 32, at least 33, at least 34, at least 35, at least 36, at least 37, at least 38, at least 39, at least 40, at least 41, at least 42, at least 43, at least 44, at least 45, at least 46, at least 47, at least 48, or at least 49). In some embodiments, the composites can exhibit a normalized flexural strength of 50 or less (e.g., 49 or less, 48 or less, 47 or less, 46 or less, 45 or less, 44 or less, 43 or less, 42 or less, 41 or less, 40 or less, 39 or less, 38 or less, 37 or less, 36 or less, 35 or less, 34 or less, 33 or less, 32 or less, 31 or less, 30 or less, 29 or less, 28 or less, 27 or less, 26 or less, 25 or less, 24 or less, 23 or less, 22 or less, or 21 or less).

The composites can exhibit a normalized flexural strength ranging from any of the minimum values described above to any of the maximum values described above. For example, the composites can exhibit a normalized flexural strength of from 20 to 50 (e.g., a normalized flexural strength of from 20 to 40, a normalized flexural strength of from 21 to 37, a normalized flexural strength of from 23 to 37, a normalized flexural strength of from 23 to 35, a normalized flexural strength of from 23 to 33, a normalized flexural strength of from 25 to 35, or a normalized flexural strength of from 25 to 33).

Isocyanates

The polyurethane systems used to form the composite materials described herein include one or more isocyanate monomers. Suitable isocyanates that can be used to form the composite materials include one or more monomeric or oligomeric poly- or di-isocyanates. The monomeric or oligomeric poly- or di-isocyanate include aromatic diisocyanates and polyisocyanates. The isocyanates can also be blocked isocyanates, or pre-polymer isocyanates (e.g., castor oil pre-polymer isocyanates and soy polyol pre-polymer isocyanates). An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 50% by weight (e.g., from about 25% to about 35% by weight). Examples of useful isocyanates are found, for example, in *Polyurethane Handbook: Chemistry, Raw Materials, Processing Application, Properties,* 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate (methylene diphenyl diisocyanate; MDI); polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof.

The average functionality of isocyanates useful with the composites described herein is between about 1.5 to about 5. Further, examples of useful isocyanates include isocyanates with an average functionality of about 2 to about 4.5, about 12 to about 4, about 14 to about 3.7, about 2.6 to about 3.4, and about 2.8 to about 3.2.

As indicated above, in the composite materials described herein, an isocyanate is reacted with a polyol to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

Polyols

The polyurethane systems used to form the composite materials described herein include one or more polyols.

Any suitable polyols may be used. Suitable additional polyols for the formation of polymeric composites are known in the art, and can be selected in view of the desired properties of the polymeric composite. Polyols can be classified as either rigid polyols or flexible polyols based on various properties of the individual polyol and the overall flexibility of a polyurethane polymer produced from the respective polyols. Generally speaking, the rigidity or flexibility of a polyurethane formed from any single polyol is governed by one or more of the hydroxyl number, functionality, and molecular weight of the polyol. Rigid polyols typically have a high hydroxyl number (e.g., a hydroxyl number of greater than 175 mg KOH/g, such as a hydroxyl number of from 250 mg KOH/g to 800 mg KOH/g), a high functionality (e.g., a functionality greater than 3.5), and/or a low molecular weight (e.g., a molecular weight of 1,000 Da or less). Flexible polyols typically have a lower hydroxyl number (e.g., a hydroxyl number of less than 150 mg KOH/g, such as a hydroxyl number of from 20 mg KOH/g to 75 mg KOH/g), a lower functionality (e.g., a functionality of 3 or less), and/or a higher molecular weight (e.g., a molecular weight of at greater than 1,000 Da).

The one or more polyols that form the polyurethane can comprise one or more high hydroxyl number polyols (e.g., one or more rigid polyols) having a hydroxyl number of at least 250 mg KOH/g. For example, in some embodiments, the one or more polyols that form the polyurethane comprise at least 95% by weight (e.g., at least 96% by weight, at least 97% by weight, at least 98% by weight, at least 99% by weight, at least at least 99.5% by weight, or at least at least 99.9% by weight), based on the total weight of the polyols that form the polyurethane, one or more high hydroxyl number polyols (e.g., one or more rigid polyols) having a hydroxyl number of at least 250 mg KOH/g. In certain embodiments, the one or more polyols that form the polyurethane consist of one or more high hydroxyl number polyols (e.g., one or more rigid polyols) having a hydroxyl number of at least 250 mg KOH/g.

In some embodiments, the one or more high hydroxyl number polyols (e.g., one or more rigid polyols) can have a hydroxyl number greater than 250 mg KOH/g (e.g., greater than 260 mg KOH/g, greater than 270 mg KOH/g, greater than 275 mg KOH/g, greater than 280 mg KOH/g, greater than 290 mg KOH/g, greater than 300 mg KOH/g, greater than 325 mg KOH/g, greater than 350 mg KOH/g, greater than 375 mg KOH/g, greater than 400 mg KOH/g, greater than 425 mg KOH/g, greater than 450 mg KOH/g, greater than 475 mg KOH/g, greater than 500 mg KOH/g, greater than 525 mg KOH/g, greater than 550 mg KOH/g, greater than 575 mg KOH/g, greater than 600 mg KOH/g, greater than 625 mg KOH/g, greater than 650 mg KOH/g, greater than 675 mg KOH/g, greater than 700 mg KOH/g, greater than 725 mg KOH/g, greater than 750 mg KOH/g, or greater than 775 mg KOH/g). In some embodiments, the one or more high hydroxyl number polyols (e.g., one or more rigid polyols) can have a hydroxyl number of 800 mg KOH/g or less (e.g., mg 775 KOH/g or less, 750 mg KOH/g or less, 725 mg KOH/g or less, 700 mg KOH/g or less, 675 mg KOH/g or less, 650 mg KOH/g or less, 625 mg KOH/g or less, 600 mg KOH/g or less, 575 mg KOH/g or less, 550 mg KOH/g or less, 525 mg KOH/g or less, 500 mg KOH/g or less, 475 mg KOH/g or less, 450 mg KOH/g or less, 425 mg KOH/g or less, 400 mg KOH/g or less, 375 mg KOH/g or less, 350 mg KOH/g or less, 325 mg KOH/g or less, 300 mg KOH/g or less, 290 mg KOH/g or less, 280 mg KOH/g or less, 275 mg KOH/g or less, 270 mg KOH/g or less, or 260 mg KOH/g or less).

The one or more high hydroxyl number polyols (e.g., one or more rigid polyols) can have a hydroxyl number ranging from any of the minimum values described above to any of the maximum values described above. For example, in some embodiments, the one or more high hydroxyl number polyols (e.g., one or more rigid polyols) can have a hydroxyl number of from 250 mg KOH/g to 800 mg KOH/g (e.g., from 250 mg KOH/g to 600 mg KOH/g, from 250 mg KOH/g to 550 mg KOH/g, from 250 mg KOH/g to 450 mg KOH/g, from 250 mg KOH/g to 350 mg KOH/g, from 300 mg KOH/g to 550 mg KOH/g, from 300 mg KOH/g to 450 mg KOH/g, or from 300 mg KOH/g to 400 mg KOH/g).

In some embodiments, the one or more high hydroxyl number polyols (e.g., one or more rigid polyols) can have a molecular weight of 1,000 Da or less (e.g., 950 Da or less, 900 Da or less, 850 Da or less, 800 Da or less, 750 Da or less, 700 Da or less, 650 Da or less, 600 Da or less, 550 Da or less, 500 Da or less, 450 Da or less, 400 Da or less, 350 Da or less, 300 Da or less, or 250 Da or less). In some embodiments, the one or more high hydroxyl number polyols (e.g., one or more rigid polyols) can have a molecular weight of at least 200 Da (e.g., at least 250 Da, at least 300 Da, at least 350 Da, at least 400 Da, at least 450 Da, at least 500 Da, at least 550 Da, at least 600 Da, at least 650 Da, at least 700 Da, at least 750 Da, at least 800 Da, at least 850 Da, at least 900 Da, or at least 950 Da).

The one or more high hydroxyl number polyols (e.g., one or more rigid polyols) can have a molecular weight ranging from any of the minimum values described above to any of the maximum values described above. For example, in some embodiments, the one or more high hydroxyl number polyols (e.g., one or more rigid polyols) can have a molecular weight of from 200 Da to 1,000 Da (e.g., from 300 Da to 600 Da, or from 400 Da to 500 Da).

In some embodiments, the one or more high hydroxyl number polyols (e.g., the one or more rigid polyols) can have a functionality of from 2 to 6 (e.g., from 1.5 to 5.5, from 1.75 to 5.25, or from 2.0 to 5.0). In certain cases, the one or more high hydroxyl number polyols (e.g., the one or more rigid polyols) can comprise polyester polyols, polyether polyols, or combinations thereof.

Examples of suitable high hydroxyl number polyols (e.g., rigid polyols) are known in the art and include, but are not limited to, CARPOL® PGP-400 (a propylene glycol-based polyether polyol commercially available from Carpenter Co., Richmond, Va.), CARPOL® GP-700 (a glycerine-based polyether polyol available from Carpenter Co., Richmond, Va.), CARPOL® SPA-357 and SPA-530 (sucrose/amine-based polyether polyols commercially available from Carpenter Co., Richmond, Va.), CARPOL® GSP-280, GSP-355, and GSP-370 (sucrose-based polyether polyols commercially available from Carpenter Co., Richmond, Va.), TEAP-265 and TEAP-335 (triethanolamine-based polyether polyols available from Carpenter Co., Richmond, Va.), JEF-FOL® R-425X and R-425X (Mannich-based polyether polyols available from Huntsman Corporation, Salt Lake City, Utah) and TEROL® 250, 198, 352, 563, 925 and 1254 (aromatic polyester polyols commercially available from Huntsman Corporation, Salt Lake City, Utah).

Optionally, the one or more polyols that form the polyurethane can include one or more additional polyols, such as a low hydroxyl number polyol (e.g., a flexible polyol). In some embodiments, the one or more polyols that form the polyurethane include less than 5% by weight (e.g., less than 4% by weight, less than 3% by weight, less than 2% by weight, less than 1% by weight, less than 0.5% by weight, or less than 0.1% by weight), based on the total weight of the one or more polyols that form the polyurethane, of one or more low hydroxyl number polyols (e.g., one or more flexible polyols) having a hydroxyl number of less than 150 mg KOH/g and a functionality of less than 3. In certain embodiments, the one or more polyols that form the polyurethane are substantially free from low hydroxyl number polyols (e.g., one or more flexible polyols) having a hydroxyl number of less than 150 mg KOH/g and a functionality of less than 3.

In some embodiments, the one or more low hydroxyl number polyols (e.g., one or more flexible polyols) can have a hydroxyl number of less than 150 mg KOH/g (e.g., less than 140 mg KOH/g, less than 130 mg KOH/g, less than 120 mg KOH/g, less than 110 mg KOH/g, less than 100 mg KOH/g, less than 90 mg KOH/g, less than 80 mg KOH/g, less than 70 mg KOH/g, less than 60 mg KOH/g, less than 50 mg KOH/g, less than 40 mg KOH/g, or less than 30 mg KOH/g). In some embodiments, the one or more low hydroxyl number polyols (e.g., one or more flexible polyols) can have a hydroxyl number of at least 20 mg KOH/g (e.g., at least 30 mg KOH/g, at least 40 mg KOH/g, at least 50 mg KOH/g, at least 60 mg KOH/g, at least 70 mg KOH/g, at least 80 mg KOH/g, at least 90 mg KOH/g, at least 100 mg KOH/g, at least 110 mg KOH/g, at least 120 mg KOH/g, at least 130 mg KOH/g, or at least 140 mg KOH/g).

The one or more low hydroxyl number polyols (e.g., one or more flexible polyols) can have a hydroxyl number ranging from any of the minimum values described above to any of the maximum values described above. For example, in some embodiments, the one or more low hydroxyl number polyols (e.g., one or more flexible polyols) can have a hydroxyl number of from 20 mg KOH/g to 150 mg KOH/g (e.g., from 25 mg KOH/g to 70 mg KOH/g, from 20 mg KOH/g to 50 mg KOH/g, from 40 mg KOH/g to 50 mg KOH/g, or from 20 mg KOH/g to 100 mg KOH/g).

In some embodiments, the one or more high hydroxyl number polyols (e.g., one or more rigid polyols) can have a molecular weight of greater than 1,000 Da (e.g., at least 1,500 Da, at least 2,000 Da, at least 2,500 Da, at least 3,000 Da, at least 3,500 Da, at least 4,000 Da, at least 4,500 Da, at least 5,000 Da, or at least 5,500 Da). In some embodiments, the one or more high hydroxyl number polyols (e.g., one or more rigid polyols) can have a molecular weight of 6,000 Da or less (e.g., 5,500 Da or less, 5,000 Da or less, 4,500 Da or less, 4,000 Da or less, 3,500 Da or less, 3,000 Da or less, 2,500 Da or less, 2,000 Da or less, or 1,500 Da or less).

The one or more low hydroxyl number polyols (e.g., one or more flexible polyols) can have a molecular weight ranging from any of the minimum values described above to any of the maximum values described above. For example, in some embodiments, the one or more low hydroxyl number polyols (e.g., one or more flexible polyols) can have a molecular weight of from 1,000 Da to 6,000 Da (e.g., from 2,500 Da to 5,000 Da, from 3,500 Da to 5,000 Da, or from 3,000 Da to 4,500 Da).

Examples of suitable low hydroxyl number polyols (e.g., flexible polyols) are known in the art and include, but are not limited to, CARPOL® PGP-1000 (propylene glycol-based polyether polyol commercially available from Carpenter Co., Richmond, Va.), VORANOL® 222-056N, (a propylene glycol-based polyether polyol commercially available from The Dow Chemical Company, Midland, Mich.), CARPOL® PGP-4025 (an ethylene oxide-capped propylene glycol-based polyether polyol commercially available from Carpenter Co., Richmond, Va.), CARPOL® GP-1000, GP-4000, and GP-5000 (glycerine-based polyether polyols commercially available from Carpenter Co., Richmond, Va.), and CARPOL® GP-4520, and GP-5015 (ethylene oxide-capped glycerine-based polyether polyols commercially available from Carpenter Co., Richmond, Va.).

In certain embodiments, the one or more polyols that form the polyurethane can consist essentially of one or more high hydroxyl number polyols (e.g., one or more rigid polyols) having a hydroxyl number of at least 250 mg KOH/g. In these embodiments, the one or more polyols that form the polyurethane can include one or more rigid polyols and optionally one or more additional polyols that are neither rigid polyols nor flexible polyols as described above, but be substantially free from low hydroxyl number polyols (e.g., flexible polyols) having a hydroxyl number of less than 150 mg KOH/g and a functionality of less than 3.

In some embodiments, the one or more polyols that form the polyurethane can have a weight average equivalent weight of at least 200 amu (e.g., at least 225 amu, at least 250 amu, at least 275 amu, at least 300 amu, at least 325 amu, at least 350 amu, at least 375 amu, at least 400 amu, at least 425 amu, at least 450 amu, at least 475 amu, at least 500 amu, at least 550 amu, at least 600 amu, at least 650 amu, at least 700 amu, at least 750 amu, at least 800 amu, at least 850 amu, at least 900 amu, at least 950 amu, at least 1000 amu, or at least 1050 amu). In some embodiments, the one or more polyols that form the polyurethane can have a weight average equivalent weight of 1100 amu or less (e.g., 1050 amu or less, 1000 amu or less, 950 amu or less, 900 amu or less, 850 amu or less, 800 amu or less, 750 amu or less, 700 amu or less, 650 amu or less, 600 amu or less, 550 amu or less, 500 amu or less, 475 amu or less, 450 amu or less, 425 amu or less, 400 amu or less, 375 amu or less, 350 amu or less, 325 amu or less, 300 amu or less, 275 amu or less, 250 amu or less, or 225 amu or less).

The one or more polyols that form the polyurethane can have a weight average equivalent weight ranging from any of the minimum values described above to any of the maximum values described above. For example, the one or more polyols that form the polyurethane can have a weight average equivalent weight ranging from 200 to 1100 amu (e.g., a weight average equivalent weight of from 200 to 600 amu, from 200 to 300 amu, or from 200 to 250 amu).

In some cases, the one or more polyols that form the polyurethane satisfy Eq. 1 below $$(2.1)(F)+(0.3)(EW)-(0.0036)(F)(EW) \geq 12 \qquad \text{Eq. 1}$$

wherein F is the weight average functionality of the one or more polyols that form the polyurethane; and EW is the weight average equivalent weight of the one or more polyols that form the polyurethane. In certain cases, the one or more polyols that form the polyurethane satisfy Eq. 2 below $$(2.1)(F)+(0.3)(EW)-(0.0036)(F)(EW) \geq 15 \qquad \text{Eq. 2}$$

wherein F is the weight average functionality of the one or more polyols that form the polyurethane; and EW is the weight average equivalent weight of the one or more polyols that form the polyurethane.

Fillers

The composite materials described herein include a particulate filler. Any suitable particulate filler can be used.

The amount of organic carbon present in a filler can be estimated by measuring the material's loss-on-ignition (LOI). The LOI of a filler refers to the percent weight loss of a sample of the filler upon ignition at 750° C. for 2 hours, and then further heated at 750° C. to a constant mass to consume any organic carbon present in the filler, as described, for example in ASTM C618-12a.

In some embodiments, the particulate filler has an LOT of at least 0.20% (e.g., at least 0.25%, at least 0.30%, at least 0.35%, at least 0.40%, at least 0.45%, at least 0.50%, at least 0.55%, at least 0.60%, at least 0.65%, at least 0.70%, at least 0.75%, at least 0.80%, at least 0.85%, at least 0.90%, at least 0.95%, at least 1.0%, at least 1.1%, at least 1.2%, at least 1.3%, at least 1.4%, at least 1.5%, at least 1.6%, at least 1.7%, at least 1.8%, at least 1.9%, at least 2.0%, at least 2.25%, at least 2.5%, at least 2.75%, at least 3.0%, at least 3.25%, at least 3.5%, at least 3.75%, at least 4.0%, at least 4.25%, at least 4.5%, at least 4.75%, at least 5.0%, at least 5.25%, at least 5.5%, at least 5.75%, at least 6.0%, at least 6.25%, at least 6.5%, at least 6.75%, at least 7.0%, at least 7.25%, at least 7.5%, at least 7.75%, at least 8.0%, at least 8.25%, at least 8.5%, at least 8.75%, at least 9.0%, at least 9.25%, at least 9.5%, at least 9.75%, at least 10.0%, at least 11%, at least 12%, at least 13%, at least 15%, at least 16%, at least 17%, at least 18%, at least 19%, at least 20%, or more).

In some embodiments, the particulate filler has an LOI of less than 25% (e.g., less than 20%, less than 19%, less than 18%, less than 17%, less than 16%, less than 15%, less than 14%, less than 13%, less than 12%, less than 11%, less than 10%, less than 9.75, less than 9.5%, less than 9.25%, less than 9.0%, less than 8.75, less than 8.5%, less than 8.25%, less than 8.0%, less than 7.75, less than 7.5%, less than 7.25%, less than 7.0%, less than 6.75%, less than 6.5%, less than 6.25%, less than 6.0%, less than 5.75%, less than 5.5%, less than 5.25%, less than 5.0%, less than 4.75%, less than 4.5%, less than 4.25%, less than 4.0%, less than 3.75%, less than 3.5%, less than 3.25%, less than 3.0%, less than 2.75%, less than 2.5%, less than 2.25%, less than 2.0%, less than 1.9%, less than 1.8%, less than 1.7%, less than 1.6%, less than 1.5%, less than 1.4%, less than 1.3%, less than 1.2%, less than 1.1%, less than 1.0%, less than 0.95%, less than 0.90%, less than 0.85%, less than 0.80%, less than 0.75%, less than 0.70%, less than 0.65%, less than 0.60%, less than 0.55%, less than 0.50%, less than 0.45%, less than 0.40%, less than 0.35%, less than 0.30%, or less than 0.25%).

The particulate filler can have an LOT ranging from any of the minimum values described above to any of the maximum values described above. For example, the particulate filler can have an LOI ranging from 0.10% to 25% (e.g., from 0.15% to 15%, from 0.20% to 10%, from 0.20% to 6.0%, from 0.20% to 5.0%, or from 0.20% to 1.0%).

In some embodiments, the particulate filler has a BET surface area, as measured using ASTM C1069-09, of at least 0.75 $m^2/g$ (e.g., at least 1.0 $m^2/g$, at least 1.1 $m^2/g$, at least 1.2 $m^2/g$, at least 1.3 $m^2/g$, at least 1.4 $m^2/g$, at least 1.5 $m^2/g$, at least 1.6 $m^2/g$, at least 1.7 $m^2/g$, at least 1.8 $m^2/g$, at least 1.9 $m^2/g$, at least 2.0 $m^2/g$, at least 2.5 $m^2/g$, at least 3.0 $m^2/g$, at least 3.5 $m^2/g$, at least 4.0 $m^2/g$, at least 4.5 $m^2/g$, at least 5.0 $m^2/g$, at least 6.0 $m^2/g$, at least 7.0 $m^2/g$, at least 8.0 $m^2/g$, at least 9.0 $m^2/g$, at least 10 $m^2/g$, at least 15 $m^2/g$, at least 20 $m^2/g$, at least 25 $m^2/g$, at least 50 $m^2/g$, at least 75 $m^2/g$, at least 100 $m^2/g$, at least 150 $m^2/g$, at least 250 $m^2/g$, at least 500 $m^2/g$, at least 750 $m^2/g$, or at least 1000 $m^2/g$). In some embodiments, the particulate filler has a BET surface area, as measured using ASTM C1069-09, of less than 100 $m^2/g$ (e.g., less than 1000 $m^2/g$, less than 750 $m^2/g$, less than 500 $m^2/g$, less than 250 $m^2/g$, less than 150 $m^2/g$, less than 100 $m^2/g$, less than 75 $m^2/g$, less than 50 $m^2/g$, less than 25 $m^2/g$, less than 20 $m^2/g$, less than 15 $m^2/g$, less than 10 $m^2/g$, less than 9.0 $m^2/g$, less than 8.0 $m^2/g$, less than 7.0 $m^2/g$, less than 6.0 $m^2/g$, less than 5.0 $m^2/g$, less than 4.5 $m^2/g$, less than 4.0 $m^2/g$, less than 3.5 $m^2/g$, less than 3.0 $m^2/g$, less than 2.5 $m^2/g$, less than 2.0 $m^2/g$, less than 1.9 $m^2/g$, less than 1.8 $m^2/g$, less than 1.7 $m^2/g$, less than 1.6 $m^2/g$, less than 1.5 $m^2/g$, less than 1.4 $m^2/g$, less than 1.3 $m^2/g$, less than 1.2 $m^2/g$, less than 1.1 $m^2/g$, less than 1.0 $m^2/g$, or less).

The particulate filler can have a BET surface area ranging from any of the minimum values described above to any of the maximum values described above. For example, the particulate filler can have a BET surface area ranging from 0.75 $m^2/g$ to 1000 $m^2/g$ (e.g., 0.75 $m^2/g$ to 500 $m^2/g$, 0.75 $m^2/g$ to 150 $m^2/g$, from 0.75 $m^2/g$ to 50 $m^2/g$, from 0.75 $m^2/g$ to 15 $m^2/g$, from 0.75 $m^2/g$ to 5.0 $m^2/g$, or from 1.0 $m^2/g$ to 4.0 $m^2/g$).

In some embodiments, the particulate filler can have a ratio of BET surface area to LOI ratio (i.e., BET/LOI) of at least 1.0 (e.g., at least 1.5, at least 2.0 at least 2.5, at least 3.0, at least 3.5, at least 4.0, at least 4.5, at least 5.0, or at least 5.5) measuring BET in $m^2/g$ and the LOI in %. In some embodiments, the particulate filler can have a ratio of BET surface area to LOT of less than 6.0 (e.g., less than 5.5, less than 5.0, less than 4.5, less than 4.0, less than 3.5, less than 3.0, less than 2.5, less than 2.0, or less than 1.5).

The particulate filler can have a ratio of BET surface area to LOI from any of the minimum values described above to any of the maximum values described above. For example, the particulate filler can have a ratio of BET surface area to LOI from 1.0 to 6.0 (e.g., from 1.5 to 5.5, or from 2.0 to 5.0).

In some embodiments, the particulate filler can comprise an inorganic filler. In certain embodiments, the particulate filler can include fly ash. The term "fly ash" is used herein generally to refer to ash by-products of the combustion of pulverized coal (e.g., in electrical power generation plants). The term fly ash, as used herein, can thus include flue-ash (i.e., fine ash particles generated during the combustion of coal that rise with flue gases, and are captured with particle filtration equipment before the exiting the chimney of a coal-fired power plant), bottom ash (e.g., ash produced during the combustion of coal which does not rise with flue gases), as well as a combination thereof (i.e., coal ash).

Fly ash is formed of mineral matter that is typically of very fine particle size, ranging from less than 1 micron to over 100 microns in some cases. The fly ash particles possess a substantially spherical shape as a consequence of the high temperature melting and coalescence in the furnace of the mineral matter accompanying the coal. The fine particle size and spherical shape are advantageous properties of the fly ash and are in marked contrast to the properties of many conventional fillers such as ground limestone or calcium carbonate, which are typically relatively coarse with an irregular, blocky particle shape.

Mineralogically, fly ash is predominantly amorphous, or non-crystalline, in nature as a result of the rapid quenching of clay/shale minerals as they rapidly pass through the boiler flame and dust collection system of the power plant. For some fly ashes, the amorphous material can be described as an aluminosilicate glass similar in composition to the mineral mullite ($Al_6Si_2O_{13}$); for other fly ashes, it can be described as a calcium aluminosilicate glass similar in composition to the mineral anorthite ($CaAl_2Si_2O_8$). Fly ashes can also contain smaller amounts of a variety of other mineral components derived from thermal modification of accessory minerals present in the coal. These can include mullite, quartz ($SiO_2$), ferrite spinel ($Fe_3O_4$), hematite ($Fe_2O_3$), dicalcium silicate ($Ca_2SiO_4$), tricalcium aluminate ($Ca_3Al_2O_6$), and lime (CaO). These mineral components can occur as inclusions in the glass particles and/or as discrete particles.

It is commonly known that the chemical composition of fly ash changes as a result of the type of coal being burned in the boiler. These differences are largely in the relative proportions of the element calcium present in the ash. For example, high rank bituminous coals generally have a low calcium content and produce an ash with relatively low calcium, typically less than 5% CaO; whereas low rank thermal coals generally have much higher content of calcium, typically in the range 8-20% CaO for lignite coals and 20-30% CaO, or higher, for subbituminous coals. These differences are recognized by ASTM specifications, such as ASTM C-618, and by Canadian specifications that classify the ashes based on their CaO content.

Current ASTM C-618 (Coal Fly Ash or Calcined Natural Pozzolan for Use in Concrete) specifications include only two designations or classes of fly ash: "Class F" and "Class C" fly ashes. The "Class F" designation generally incorporates fly ashes originating from the combustion of bituminous and lignite coals and the "Class C" designation generally incorporates ashes from the combustion of subbituminous coals. These designations are based on the chemical composition of the fly ash in such a way that when the sum of the element oxides ($SiO_2+Al_2O_3+Fe_2O_3$) derived from chemical analysis of the ash is equal to or greater than 70% by weight, then the fly ash is designated a "Class F" fly ash. When the sum of the element oxides is equal to or greater than 50% by weight, the fly ash is designated as a "Class C" fly ash. In Canada, as mentioned above, fly ashes have certain designations based on their CaO content. In particular, a fly ash is considered a "Class F" when it includes less than 8% CaO, a "Class CI" when it includes 8-20% CaO, and a "Class CH" when it includes greater than 20% CaO.

The fly ash can be a lignite fly ash, a subbituminous fly ash, a bituminous fly ash, or a blend of two or more fly ashes (e.g., a subbituminous/bituminous fly ash blend). The fly ash can be a Class C fly ash, a Class F fly ash, or a blend thereof. In certain embodiments, the particulate filler includes fly ash having an LOI ranging from 0.20% to 10% (e.g., from 0.20% to 5.0%, or from 0.20% to 1.0%), a BET surface area ranging from 0.75 $m^2$/g to 15 $m^2$/g (e.g., from 0.75 $m^2$/g to 5.0 $m^2$/g, or from 1.0 $m^2$/g to 4.0 $m^2$/g), and/or a BET surface area to LOT ratio ranging from 1.0 to 6.0 (e.g., from 1.5 to 5.5, or from 2.0 to 5.0).

Other suitable fillers include, by way of example, graphite, activated carbon, amorphous carbon (e.g., carbon black), absorptive clays (e.g., absorptive silicate minerals such as kaolin), other combustion ashes (e.g., ashes produced by firing one or more fuels including industrial gases, petroleum coke, petroleum products, municipal solid waste, paper sludge, wood, sawdust, refuse derived fuels, switchgrass, or other biomass material), glass particles, sand, granite dust, slate dust, and combinations thereof. These fillers can be used alone, or in combination with fly ash. In some embodiments, the particulate filler consists of or consists essentially of fly ash.

The composites described herein can include at least 35% by weight particulate filler, based on the total weight of the composite (e.g., at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight). In some embodiments, the composites can include 90% or less by weight particulate filler, based on the total weight of the composite (e.g., less than 85% by weight, less than 80% by weight, less than 75% by weight, less than 70% by weight, less than 65% by weight, less than 60% by weight, less than 55% by weight, less than 50% by weight, less than 45% by weight, or less than 40% by weight).

The particulate filler can be present in the composition in an amount from any of the minimum values described above to any of the maximum values described above. For example the total amount of particulate filler in the composite material can range 35% to 90% by weight, based on the total weight of the composition (e.g., from 40% to 90% by weight, from 50% to 85% by weight, or from 60% to 80% by weight).

Additional Components

One or more catalysts are added to facilitate curing and can be used to control the curing time of the polyurethane matrix. Examples of suitable catalysts include amine-containing catalysts (such as 1,4-diazabicyclo[2.2.2]octane (DABCO or triethylenediamine and tetramethylbutanediamine), tin catalysts (e.g., an organotin catalyst such as dimethyltin oleate), as well mercury- and bismuth-containing catalysts. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %), based on the total weight of the polyurethane, can be used.

Additional components useful with the composite materials described herein include additional fillers, foaming agents, blowing agents, surfactants, chain-extenders, cross-linkers, coupling agents, UV stabilizers, fire retardants, antimicrobials, anti-oxidants, and pigments. Though the use of such components is well known to those of skill in the art, some of these additional additives are further described herein.

One or more additional fillers can be used in the composite materials described herein. Examples of additional fillers useful with the composite materials include other types of ash such as those produced by firing fuels including industrial gases, petroleum coke, petroleum products, municipal solid waste, paper sludge, wood, sawdust, refuse derived fuels, switchgrass or other biomass material. The one of more additional fillers can also include ground/recycled glass (e.g., window or bottle glass); milled glass; glass spheres; glass flakes; calcium carbonate; aluminum trihydrate (ATH); silica; sand; ground sand; silica fume; slate dust; crusher fines; red mud; mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; inorganic fibers; soy meal; pulverized foam; and mixtures thereof.

In some embodiments, inorganic fibers or organic fibers can be included in the polymer composite, e.g., to provide increased strength, stiffness or toughness. Fibers suitable for use with the composite materials described herein can be provided in the form of individual fibers, fabrics, ravings, or tows. These can be added prior to polymerization and can be chopped before or during the mixing process to provide desired fiber lengths. Alternately, the fibers can be added after polymerization, for example, after the composite material exits the mixing apparatus. The fibers can be up to about 2 in. in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers.

The inclusion of additional fillers in the composite materials as described herein can modify and/or improve the chemical and mechanical properties of the composite materials. For example, the optimization of various properties of the composite materials allows their use in building materials and other structural applications. High filler loading levels can be used in composite materials without a substantial reduction of (and potentially an improvement in) the intrinsic structural, physical, and mechanical properties of a composite. The use of filled composites as building materials has advantages over composite materials made using lower filler levels or no filler. For example, the use of higher filler loading levels in building materials may allow the building materials to be produced at a substantially decreased cost.

Foaming agents and blowing agents may be added to the composite materials described herein to produce a foamed version of the composite materials. Examples of blowing agents include organic blowing agents, such as halogenated hydrocarbons, acetone, pentanes, carbon dioxide, and other materials that have a boiling point below the reaction temperature. Chemical foaming agents include azadicarbonamides (e.g., Celogen manufactured by Lion Copolymer Geismar); and other materials that react at the reaction temperature to form gases such as carbon dioxide. Water is an exemplary foaming agent that reacts with isocyanate to yield carbon dioxide. The presence of water as an added component or in the filler also can result in the formation of polyurea bonds through the reaction of the water and isocyanate.

The addition of excess foaming or blowing agents above what is needed to complete the foaming reaction can add strength and stiffness to the composite material, improve the water resistance of the composite material, and increase the thickness and durability of the outer skin of the composite material. Such excessive blowing agent may produce a vigorously foaming reaction product. To contain the reaction product, a forming device that contains the pressure or restrains the materials from expanding beyond the design limits may be used, such as a stationary or continuous mold.

Surfactants can be used as wetting agents and to assist in mixing and dispersing the inorganic particulate material in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as DC-197 and DC-193 (Air Products; Allentown, Pa.) can be used.

Low molecular weight reactants such as chain-extenders and/or crosslinkers can be included in the composite materials described herein. These reactants help the polyurethane system to distribute and contain the inorganic filler and/or fibers within the composite material. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some composites, a crosslinker or chain-extender may be used to replace at least a portion of the at least one polyol in the composite material. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the composite material. Coupling agents can allow higher filler loadings of an inorganic filler such as fly ash and may be used in small quantities. For example, the composite material may comprise about 0.01 wt % to about 0.5 wt % of a coupling agent. Examples of coupling agents useful with the composite materials described herein include Ken-React LICA 38 and KEN-React KR 55 (Kenrich Petrochemicals; Bayonne, N.J.). Examples of dispersing agents useful with the composite materials described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the composite materials described herein. Examples of UV light stabilizers include hindered amine type stabilizers and opaque pigments. Fire retardants can be included to increase the flame or fire resistance of the composite material. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the composite materials described herein. An example of a pigment is iron oxide, which can be added in amounts ranging from about 2 wt % to about 7 wt %, based on the total weight of the composite material.

A method of preparing a composite material is also described herein. The method can include mixing (1) a particulate filler; (2) at least one isocyanate selected from the group consisting of diisocyanates, polyisocyanates, and combinations thereof; (3) one or more polyols; and (4) a catalyst. The at least one isocyanate and the one or more polyols are allowed to react in the presence of the particulate filler and catalyst to form the composite material. In some cases, the one or more polyols can comprise a high hydroxyl number polyol having a hydroxyl number of at least 250, and the one or more polyols can have a weight average equivalent weight of from 200 to 1100 amu. In some cases, the one or more polyols that form the polyurethane can comprise one or more rigid polyols having a hydroxyl number of at least 250, and the one or more polyols that form the polyurethane can include less than 5% by weight, based on the total weight of the one or more polyols that form the polyurethane, of one or more flexible polyols having a hydroxyl number of less than 150 and a functionality of less than 3.

The composite material can be produced using a batch, semi-batch, or continuous process. At least a portion of the mixing step, reacting step, or both, can be conducted in a mixing apparatus such as a high speed mixer or an extruder. The method can further include the step of extruding the resulting composite material through a die or nozzle.

In some embodiments, a mixing step of the method used to prepare the composite materials described herein includes: (1) mixing the particulate filler and the one or more polyols; (2) mixing the isocyanate with the particulate filler and the one or more polyols; and (3) mixing the catalyst with the isocyanate, the particulate filler, and the one or more polyols. In some embodiments, a mixing step of the method used to prepare the composite materials described herein includes mixing the liquid ingredients (i.e., the one or more polyols, isocyanate, catalyst, surfactants, and water) and then combining the mixed liquid ingredients with the particulate filler and optional fiber. As the composite material exits the die or nozzle, the composite material may be placed in a mold for post-extrusion curing and shaping. For example, the composite material can be allowed to cure in individual molds or it can be allowed to cure in a continuous forming system such as a belt molding system.

An ultrasonic device can be used for enhanced mixing and/or wetting of the various components of the composite materials described herein. Such enhanced mixing and/or wetting can allow a high concentration of filler to be mixed with the polyurethane matrix. The ultrasonic device produces an ultrasound of a certain frequency that can be varied during the mixing and/or extrusion process. The ultrasonic device useful in the preparation of composite materials described herein can be attached to or adjacent to an extruder and/or mixer. For example, the ultrasonic device can be attached to a die or nozzle or to the port of an extruder or mixer. An ultrasonic device may provide de-aeration of undesired gas bubbles and better mixing for the other components, such as blowing agents, surfactants, and catalysts.

The composite materials described herein can be foamed. The one or more polyols and the isocyanate can be allowed to produce a foamed composite material after mixing the components according to the methods described herein. The composite materials described herein can be formed while they are actively foaming or after they have foamed. For example, the material can be placed under the pressure of a mold cavity prior to or during the foaming of the composite material. When a foaming composite material is molded by a belt molding system into a product shape, the pressure that the foamed part exerts on the belts impacts the resulting mechanical properties. For example, as the pressure of the foaming increases and if the belt system can hold this pressure without the belts separating, then the product may have higher flexural strength than if the belts allowed leaking or pressure drop.

The composite materials described herein can be formed into shaped articles and used in various applications including building materials. Examples of such building materials include siding material, roof coatings, roof tiles, roofing material, carpet backing, flexible or rigid foams such as automotive foams (e.g., for dashboard, seats or roofing), component coating, and other shaped articles. Examples of shaped articles made using composite materials described herein include roofing material such as roof tile shingles; siding material; trim boards; carpet backing; synthetic lumber; building panels; scaffolding; cast molded products; decking materials; fencing materials; marine lumber; doors; door parts; moldings; sills; stone; masonry; brick products; posts; signs; guard rails; retaining walls; park benches; tables; slats; and railroad ties. The composite materials described herein further can be used as reinforcement of composite structural members including building materials such as doors; windows; furniture; and cabinets and for well and concrete repair. The composite materials described herein also can be used to fill gaps, particularly to increase the strength of solid surface articles and/or structural components. The composite materials can be flexible, semi-rigid or rigid foams. In some embodiments, the flexible foam is reversibly deformable (i.e., resilient) and can include open cells. A 8"×1"×1" piece of a flexible foam can generally wrap around a 1" diameter mandrel at room temperature without rupture or fracture. Flexible foams also generally have a density of less than 5 lb/ft$^3$ (e.g., 1 to 5 lb/ft$^3$). In some embodiments, the rigid foam is irreversibly deformable and can be highly crosslinked and/or can include closed cells. Rigid foams generally have a density of 1 lb/ft$^3$ or greater (e.g., 1 to 60 lb/ft$^3$, 5 to 60 lb/ft$^3$, 20 to 55 lb/ft$^3$, or 30 to 50 lb/ft$^3$).

The examples below are intended to further illustrate certain aspects of the compositions and methods described herein, and are not intended to limit the scope of the claims. All parts and percentages are provided on a per weight basis, unless indicated otherwise.

Examples

General Test Methods

Composite materials were characterized using the following test methods unless otherwise noted.

The flexural strength of a composite material was determined according to the method described in ASTM C1185-08 (Reapproved 2012) entitled "Standard Test Methods for Sampling and Testing Non-Asbestos Fiber-Cement Flat Sheet, Roofing and Siding Shingles, and Clapboards," which is incorporated herein by reference in its entirety. See Section 5. Briefly, a composite material free from fiber reinforcement was formed in a ¾"×3½"×15" mold. Prior to measurement, the sample boards were conditioned for at least 48 hours at 23±2° C. and 50±5% relative humidity. The average thickness of the sample boards was also measured as described in ASTM C1185-08, section 5.2.4.1. For a given composite material, 4-6 samples were made and tested and the results were averaged.

The bottom surface of each sample board was placed on supports spaced 10±1/16" apart. A load was applied to the top surface the sample board at the mid-span of the board. The deflection of the sample board upon a maximum applied load was then measured as described in ASTM C1185-08. The flexural strength of each sample board was then calculated using the equation below $$R = \frac{3PL}{2bd^2}$$

where R is the flexural strength (in psi), P is the maximum load (in lbs), L is the length of the span (in inches), b is the width of the sample board (in inches), and d is the average thickness of the sample board (in inches). The flexural strength of the composite material was the arithmetic mean of the flexural strength measured for the sample boards formed from a composite material.

The density of a composite material was determined according to the method described in ASTM C1185-08 (Reapproved 2012) entitled "Standard Test Methods for Sampling and Testing Non-Asbestos Fiber-Cement Flat Sheet, Roofing and Siding Shingles, and Clapboards," which is incorporated herein by reference in its entirety. See Section 6.

The normalized flexural strength of a composite material was determined by dividing the flexural strength of the composite material, as determined using the method described above, by the density of the composite material, as determined using the method described above.

Preparation and Characterization of Composite Materials

Composites 1-8 were prepared using eight different polyol blends, each with varying functionality and weight average equivalent weight of polyol components. See Table 1. For each trial, a polyol blend was prepared by mixing the polyol components with 1% water, 2% TEGOSTAB® B-8870 surfactant (commercially available from Evonik Industries AG, Essen, Germany), and 0.1% POLYCAT® 8 catalyst (commercially available from Air Products and Chemicals, Allentown, Pa.) at a quantity to make at least 6 samples. Each sample was prepared using 175 g of fly ash and 175 g of a given polyol blend and RUBINATE® M isocyanate (31.5% NCO, commercially available from Huntsman Corporation, Salt Lake City, Utah) at the calculated ratio to give 104 index. The fly ash was wetted with the polyol blend in a 1-liter cup. The RUBINATE® M was added, and the components were mixed for 12 seconds with a drill press. The mixture was quickly poured into a ¾"×3½"×15" mold and the lid was then closed and clamped. After 6 minutes, the sample was removed and conditioned as described above before testing.

TABLE 1

Polyol Components of Composites 1-8.

| Trial | Functionality | Weight Average Equivalent Weight of Polyol Components (amu) | Polyol Components[†] |
|---|---|---|---|
| 1 | 2 | 210 | [1]CARPOL® PGP-400 (96.67%) [2]CARPOL® PGP-1000 (3.33%) |
| 2 | 5 | 217.4 | [3]CARPOL® SPA-530 (80%) [4]CARPOL® GP-2012 (20%) |
| 3 | 2 | 1100 | [5]VORANOL® 222-056N (90%) [6]CARPOL® PGP-4025 (10%) |
| 4 | 5 | 1100 | [7]CARPOL® GSP-280 (50%) [8]CARPOL® GP-6015 (50%) |
| 5 | 2 | 212.2 | [1]CARPOL® PGP-400 (50%) [9]TEROL® 250 (50%) |
| 6 | 5 | 209.6 | [9]TEROL® 250 (40%) [7]CARPOL® GSP-280 (60%) |
| 7 | 2 | 1100.59 | [6]CARPOL® PGP-4025 (47%) [10]TEROL® 198 (53%) |
| 8 | 3.5 | 655 | [7]CARPOL® GSP-280 (25%) [8]CARPOL® GP-6015 (25%) [1]CARPOL® PGP-400 (25%) [9]TEROL® 250 (25%) |

Figure 2:
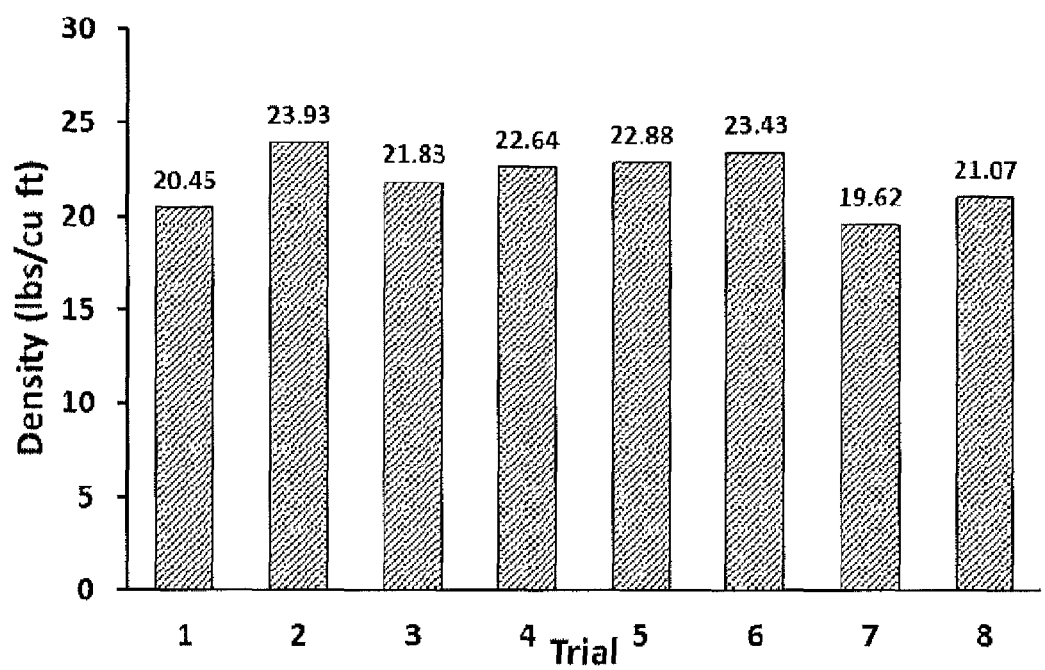
FIG. 2 is a plot illustrating the density of composites 1-8

[†]Percentage in parentheses following each polyol component is the weight percent of the polyol component in the polyol blend used to form the polyurethane, based on the total weight of all of the polyols that form the polyurethane.
[1]Propylene glycol-based polyether polyol; available from Carpenter Co., Richmond, VA
[2]Propylene glycol-based polyether polyol; available from Carpenter Co., Richmond, VA
[3]Sucrose/amine-based polyether polyol; available from Carpenter Co., Richmond, VA
[4]Alkylene oxide-capped glycerine; available from Carpenter Co., Richmond, VA
[5]Propylene glycol-based polyether polyol; available from The Dow Chemical Company, Midland, MI
[6]Alkylene oxide-capped propylene glycol-based polyether polyol; available from Carpenter Co., Richmond, VA
[7]Sucrose-based polyether polyol; available from Carpenter Co., Richmond, VA
[8]Glycerine-based polyether polyol; available from Carpenter Co., Richmond, VA
[9]Aromatic polyester polyol; available from Huntsman Corporation, Salt Lake City, UT
[10]Aromatic polyester polyol; available from Huntsman Corporation, Salt Lake City, UT The flexural strength and density of Composites 1-8 were measured using the standard methods described above. As shown in Table 2 and FIG. 1, composites prepared from at least 95% by weight, based on the total weight of the polyols that form the polyurethane, of one or more rigid polyols having a hydroxyl number of at least 250 (Trials 1, 2, 5, and 6) exhibit high flexural strengths ranging from 604.08 to 714.73 psi. In contrast, composites prepared from polyol blends that include a flexible polyol exhibit significantly lower flexural strengths (e.g., flexural strengths ranging from 111.95 to 415.88 psi). As shown in Table 2 and FIG. 2, Composites 1-8 exhibit densities ranging from 19.62 to 23.93 lbs/cu ft.

TABLE 2

Flexural strength, density, and normalized flexural strength of Composites 1-8.

| Trial | Flexural Strength (psi) | Density (lbs/cu ft) | Normalized Flexural Strength |
|---|---|---|---|
| 1 | 627.23 | 20.45 | 30.67 |
| 2 | 604.08 | 23.93 | 25.24 |
| 3 | 111.95 | 21.83 | 5.13 |
| 4 | 378.97 | 22.64 | 16.74 |
| 5 | 714.73 | 22.88 | 31.24 |
| 6 | 668.60 | 23.43 | 28.54 |
| 7 | 323.13 | 19.62 | 16.47 |
| 8 | 415.88 | 21.07 | 19.74 |

Figure 3:
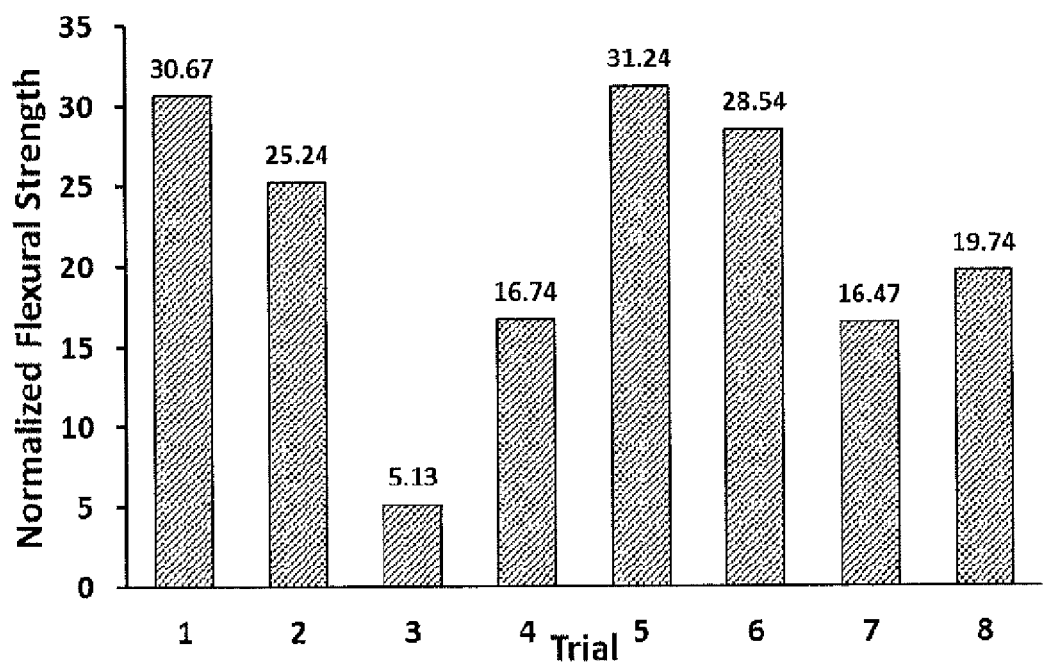
FIG. 3 is a plot illustrating the normalized flexural strength of composites 1-8.

The normalized flexural strength of Composites 1-8 was calculated as described above. As shown in Table 2 and FIG. 3, composites prepared from at least 95% by weight, based on the total weight of the polyols that form the polyurethane, of one or more rigid polyols having a hydroxyl number of at least 250 (Trials 1, 2, 5, and 6) exhibit high normalized flexural strengths ranging from 25.24 to 31.24. In contrast, composites prepared from polyol blends that include a flexible polyol exhibit significantly lower normalized flexural strengths (e.g., normalized flexural strengths ranging from 5.13 to 19.74).

These results suggest that when preparing highly filed polyurethane composites (e.g., composites that include from 35% to 90% by weight particulate filler, based on the total weight of the composition), flexible polyols are not needed to prepare composite materials having a high flexural strength. On the contrary, composite materials having improved flexural strength can be prepared from polyol blends that include less than 5% by weight of one or more flexible polyols, based on the total weight of the polyol blend used to form the polyurethane.

The composites, materials and methods of the appended claims are not limited in scope by the specific composites and methods described herein, which are intended as illustrations of a few aspects of the claims and any composites, materials, and methods that are functionally equivalent are intended to fall within the scope of the claims. Various modifications of the composites, materials and methods in addition to those shown and described herein are intended to fall within the scope of the appended claims. Further, while only certain representative composites, materials, and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially" of and "consisting of" can be used in place of "comprising" and "including" to provide for more specific embodiments of the invention and are also disclosed.

That which is claimed:

1. A composite comprising:
   (a) a polyurethane formed by the reaction of (i) one or more isocyanates selected from the group consisting of diisocyanates, polyisocyanates, and mixtures thereof, and (ii) one or more polyols,
   wherein the one or more polyols comprise at least 95% by weight, based on the total weight of the one or more polyols, of one or more high hydroxyl number polyols having a hydroxyl number of at least 250 mg KOH/g, and
   wherein the one or more polyols have a weight average equivalent weight of from 200 amu to 250 amu; and
   (b) from 35% by weight to 90% by weight, based on the total weight of the composite, of a particulate filler,
   wherein the particulate filler has at least one of: (a) a loss-on-ignition at 750° C. of 0.10% to 5.0% when determined in accordance with ASTM C618-12a; or (b) a ratio of BET surface area to loss-on-ignition of 1.5 to 5.5, wherein BET surface area is measured in m$^2$/g and loss-on-ignition is measured in percent, wherein BET surface area is determined in accordance with ASTM C1069-09, and wherein loss-on-ignition is determined in accordance with ASTM C618-12a.

2. The composite of claim 1, wherein the one or more polyols satisfy Eq. 1 below $$(2.1)(F)+(0.3)(EW)-(0.0036)(F)(EW)>12 \qquad \text{Eq. 1}$$

wherein
F is the weight average functionality of the one or more polyols; and
EW is the weight average equivalent weight of the one or more polyols.

3. The composite of claim 1, wherein the one or more polyols satisfy Eq. 2 below $$(2.1)(F)+(0.3)(EW)-(0.0036)(F)(EW)>15 \qquad \text{Eq. 2}$$

wherein
F is the weight average functionality of the one or more polyols; and
EW is the weight average equivalent weight of the one or more polyols.

4. The composite of claim 1, wherein the particulate filler comprises an inorganic filler fly ash.

5. The composite of claim 1, wherein the composite comprises from 45% by weight to 70% by weight, based on the total weight of the composite, of the particulate filler.

6. A composite comprising:
   (a) a polyurethane formed by the reaction of (i) one or more isocyanates selected from the group consisting of diisocyanates, polyisocyanates, and mixtures thereof, and (ii) one or more polyols,
   wherein the one or more polyols include at least 95% by weight, based on the total weight of the one or more polyols, of one or more rigid polyols having a hydroxyl number of at least 250 mg KOH/g, and
   wherein the one or more polyols include less than 5% by weight, based on the total weight of the one or more polyols, of one or more flexible polyols having a hydroxyl number of less than 150 mg KOH/g and a functionality of less than 3; and
   wherein the one or more polyols have a weight average equivalent weight of from 200 amu to 250 amu; and
   (b) from 35% by weight to 90% by weight, based on the total weight of the composite, of a particulate filler,
   wherein the particulate filler has at least one of: (a) a loss-on-ignition at 750° C. of 0.10% to 5.0% when determined in accordance with ASTM 0618-12a; or (b) a ratio of BET surface area to loss-on-ignition of 1.5 to 5.5, wherein BET surface area is measured in m$^2$/g and loss-on-ignition is measured in percent, wherein BET surface area is determined in accordance with ASTM C1069-09, and wherein loss-on-ignition is determined in accordance with ASTM 0618-12a.

7. The composite of 17, wherein the one or more polyols include less than 1% by weight, based on the total weight of the one or more polyols, of one or more flexible polyols having a hydroxyl number of less than 150 mg KOH/g and a functionality of less than 3.

8. The composite of claim 6, wherein the one or more polyols satisfy Eq. 1 below $$(2.1)(F)+(0.3)(EW)-(0.0036)(F)(EW)>12 \qquad \text{Eq. 1}$$

wherein
F is the weight average functionality of the one or more polyols; and
EW is the weight average equivalent weight of the one or more polyols.

9. The composite of claim 6, wherein the one or more polyols satisfy Eq. 2 below $$(2.1)(F)+(0.3)(EW)-(0.0036)(F)(EW)>15 \qquad \text{Eq. 2}$$

wherein
F is the weight average functionality of the one or more polyols; and
EW is the weight average equivalent weight of the one or more polyols.

10. The composite of claim 6, wherein the particulate filler comprises an inorganic filler fly ash.

11. The composite of claim 6, wherein the composite comprises from 45% to 70% by weight, based on the total weight of the composite, of the particulate filler.

12. A method of preparing a composite material, comprising:
   mixing (1) a particulate filler; (2) at least one isocyanate selected from the group consisting of diisocyanates, polyisocyanates, and combinations thereof; (3) one or more polyols, wherein the one or more polyols comprise at least 95% by weight, based on the total weight of the polyols, a high hydroxyl number polyol having a hydroxyl number of at least 250 mg KOH/g, and wherein the one or more polyols have a weight average equivalent weight of from 200 amu to 250 amu; and (4) a catalyst; and
   allowing the at least one isocyanate and the one or more polyols to react in the presence of the particulate filler and the catalyst to form the composite material;
   from 35% by weight to 90% by weight, based on the total weight of the composite, of a particulate filler,
   wherein the particulate filler has at least one of: (a) a loss-on-ignition at 750° C. of 0.10% to 5.0% when determined in accordance with ASTM 0618-12a; or (b) a ratio of BET surface area to loss-on-ignition of 1.5 to 5.5, wherein BET surface area is measured in m$^2$/g and loss-on-ignition is measured in percent, wherein BET surface area is determined in accordance with ASTM C1069-09, and wherein loss-on-ignition is determined in accordance with ASTM 0618-12a.

13. The composite of claim 1, wherein the composite has a normalized flexural strength of 20 to 50.

14. The composite of claim 6, wherein the composite has a normalized flexural strength of 20 to 50.

15. The composite of claim 1, wherein the one or more polyols comprise at least 99.9% by weight, based on the total weight of the one or more polyols, of one or more high hydroxyl number polyols having a hydroxyl number of at least 250 mg KOH/g.

\* \* \* \* \*